(12) United States Patent
Solmer et al.

(10) Patent No.: US 9,418,145 B2
(45) Date of Patent: Aug. 16, 2016

(54) METHOD AND SYSTEM FOR VISUALIZING DOCUMENTS

(71) Applicant: TextWise Company, LLC, Fairport, NY (US)

(72) Inventors: Robert Solmer, San Diego, CA (US); Wen Ruan, Manlius, NY (US)

(73) Assignee: TEXTWISE COMPANY, LLC, Fairport, NY (US)

( * ) Notice: Subject to any disclaimer, the term of this patent is extended or adjusted under 35 U.S.C. 154(b) by 761 days.

(21) Appl. No.: 13/758,261

(22) Filed: Feb. 4, 2013

(65) Prior Publication Data
US 2014/0223296 A1 Aug. 7, 2014

(51) Int. Cl.
*G06F 17/30* (2006.01)

(52) U.S. Cl.
CPC .... *G06F 17/30696* (2013.01); *G06F 17/30651* (2013.01); *G06F 17/30716* (2013.01)

(58) Field of Classification Search
CPC ............... G06F 17/30969; G06F 17/30716; G06F 17/30651
USPC ........................................................ 715/273
See application file for complete search history.

(56) References Cited

U.S. PATENT DOCUMENTS

| | | | |
|---|---|---|---|
| 2003/0069873 A1 | 4/2003 | Fox et al. | |
| 2003/0204492 A1* | 10/2003 | Wolf | G06F 17/30681 |
| 2006/0164409 A1 | 7/2006 | Borchardt et al. | |
| 2008/0276201 A1 | 11/2008 | Risch et al. | |
| 2010/0039431 A1 | 2/2010 | Evans | |
| 2010/0332465 A1* | 12/2010 | Janssens | G06Q 30/02 707/722 |
| 2011/0055203 A1* | 3/2011 | Gutt | G06F 17/30533 707/722 |
| 2014/0195534 A1* | 7/2014 | Diament | G06F 17/30705 707/737 |

OTHER PUBLICATIONS

International Preliminary Report on Patentability issued Aug. 4, 2015 in International Application PCT/US2014/013711.
International Search Report and Written Opinion mailed Jan. 5, 2015 in International Application PCT/US2014/13711.

* cited by examiner

*Primary Examiner* — Scott Baderman
*Assistant Examiner* — Seung Jung
(74) *Attorney, Agent, or Firm* — Pillsbury Winthrop Shaw Pittman LLP

(57) ABSTRACT

Method and system for visualizing documents. N-dimensional compact representations are obtained for a set of documents. A plurality of documents is retrieved with corresponding N-dimensional compact representations and each of the retrieved documents is associated with one or more concepts. Each retrieved document is projected to a point on a K-dimensional map based on its N-dimensional compact representation so that projected document points in the K-dimensional map maintain the relative distances among the retrieved documents in the N-dimensional space. Regions in the K-dimensional map associated with concepts are identified. A label is generated for each concept in each identified region. Then generated labels are then rendered on the K-dimensional map in a corresponding region identified.

20 Claims, 18 Drawing Sheets

METHOD AND SYSTEM FOR VISUALIZING DOCUMENTS

BACKGROUND

1. Technical Field

The disclosure relates generally to a method and system for information visualization.

2. Discussion of Technical Background

An information search and retrieval system locates relevant documents stored in a media and renders the documents in a result set in response to a query. The query may come from a user input, and the retrieved documents may be rendered in a ranked order to the user based on relevance, time, or other criteria. To help a user to quickly identify main concepts within the result set, various visualization techniques have been implemented to display retrieved documents in a two-dimensional space.

Due to the computational complexity and limited effectiveness of projecting documents from a high dimensional term space to a two-dimensional space, an intermediate procedure may be applied to reduce the number of dimensions involved in the projection process. Document classification has been applied to classify retrieved documents into predefined classes, the number of which is smaller than the number of terms in the documents. The classes are projected to a two-dimensional map, and the documents are then placed with regard to classes on the two-dimensional map. Document clustering provides another way to reduce the dimensionality by grouping retrieved documents into clusters. The cluster centers are projected to a two-dimensional map and documents are placed with regard to the cluster centers on the two-dimensional map. The rendered map in both document classification and document clustering identifies main concepts, by class and cluster labels respectively.

However, there are some drawbacks in both techniques of document classification and document clustering. First, the semantic relatedness between documents is not clearly represented on the two-dimensional map, so that documents close to each other are not necessarily more related than those placed apart. Second, the choice of cluster or class in which to classify a particular document may appear arbitrary when the document includes multiple topics represented by different clusters/classes and/or when multiple clusters/classes describe similar topics. Third, the placement of labels representing main concepts does not take into account the global distribution of concepts across classes/clusters on the two-dimensional map. So the concepts that occur in documents scattered in multiple classes/clusters are likely under-represented, i.e., not significant enough to be selected as labels.

Accordingly, there exists a need for a document visualization technique to overcome the above drawbacks.

SUMMARY

The present disclosure describes methods, system, and programming for visualizing documents.

In one exemplary embodiment, a method, implemented on at least one machine having at least one processor, storage, and a communication platform connected to a network for visualizing documents, is provided. N-dimensional compact representations are obtained for a set of documents. A plurality of documents is then retrieved with the corresponding N-dimensional compact representations. Each of the retrieved documents is associated with at least one concept. Each of the retrieved documents is projected to a point on a K-dimensional map based on its N-dimensional compact representation so that projected document points in the K-dimensional map maintain the relative distances among the retrieved documents in the N-dimensional space. Each region associated with a concept is identified in the K-dimensional map. A label is generated for each concept in each region identified. Then one or more of the generated labels are rendered on the K-dimensional map in corresponding regions identified.

In another exemplary embodiment, a method, implemented on at least one machine having at least one processor, storage, and a communication platform connected to a network for document retrieval and visualization, is provided. A query is received from a user via the communication platform. A plurality of documents is then retrieved based on the query. Each of the retrieved documents is represented by an N-dimensional compact representation and associated with at least one concept. Each of the retrieved documents is projected to a point on a K-dimensional map based on its N-dimensional compact representation so that projected document points in the K-dimensional map maintain the relative distances among the retrieved documents in the N-dimensional space. Each region associated with a concept is identified in the K-dimensional map. A label is generated for each concept in each region identified. Then a rendition of the K-dimensional map is transmitted, as a response to the query via the communication platform, with the plurality of documents projected therein and having one or more of the generated labels rendered in corresponding regions identified on the map.

In still another exemplary embodiment, a method, implemented on at least one machine having at least one processor, storage, and a communication platform connected to a network for document retrieval and visualization, is provided. A first query is received from a user via the communication platform. A plurality of documents is then retrieved based on the first query. Each of the retrieved documents is represented by an N-dimensional compact representation and associated with at least one concept. Each of the retrieved documents is projected to a point on a K-dimensional map based on its N-dimensional compact representation so that projected document points in the K-dimensional map maintain the relative distances among the retrieved documents in the N-dimensional space. Each region associated with a concept is identified in the K-dimensional map. A label is generated for each concept in each region identified. A rendition of the K-dimensional map is transmitted, as a response to the first query, with the plurality of documents projected therein and one or more generated labels rendered in a corresponding region identified. Then a second query is automatically generated based on one or more interactions of the user with the K-dimensional map. At least one new document is retrieved, based on the second query. Each of the at least one new document is represented by an N-dimensional compact representation, and associated with at least one concept. Each of the at least one new document and optionally the existing documents is projected to a point on the K-dimensional map based on its N-dimensional compact representation so that the projected document points, which include the at least one newly projected document point, but may or may not include the existing document points, maintain the relative distances in the N-dimensional space. Each region associated with a concept is identified in the K-dimensional map. A new label is generated for each concept in each region identified. One or more of the new labels are rendered in the K-dimensional map to generate an updated K-dimensional map. A rendition of the updated K-dimensional map is transmitted, as a response to the interactions of the user with the K-dimensional map.

In yet another exemplary embodiment, a method, implemented on at least one machine having at least one processor, storage, and a communication platform connected to a network for visualizing documents, is provided. N-dimensional compact representations are obtained for a set of documents. A plurality of documents is then retrieved with the corresponding N-dimensional compact representations. Each of the retrieved documents is associated with at least one concept. Each subspace associated with a concept is identified in the N-dimensional space. Each of the retrieved documents and subspaces associated with concepts, is projected to a point or a region on a K-dimensional map based on its N-dimensional representation so that projected document points and subspaces associated with concepts in the K-dimensional map maintain the relative distances among the retrieved documents and subspaces associated with concepts in the N-dimensional space. A label is generated for each concept in each region projected from an identified subspace. Then one or more of the generated labels are rendered on the K-dimensional map in corresponding regions.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Figure 1:
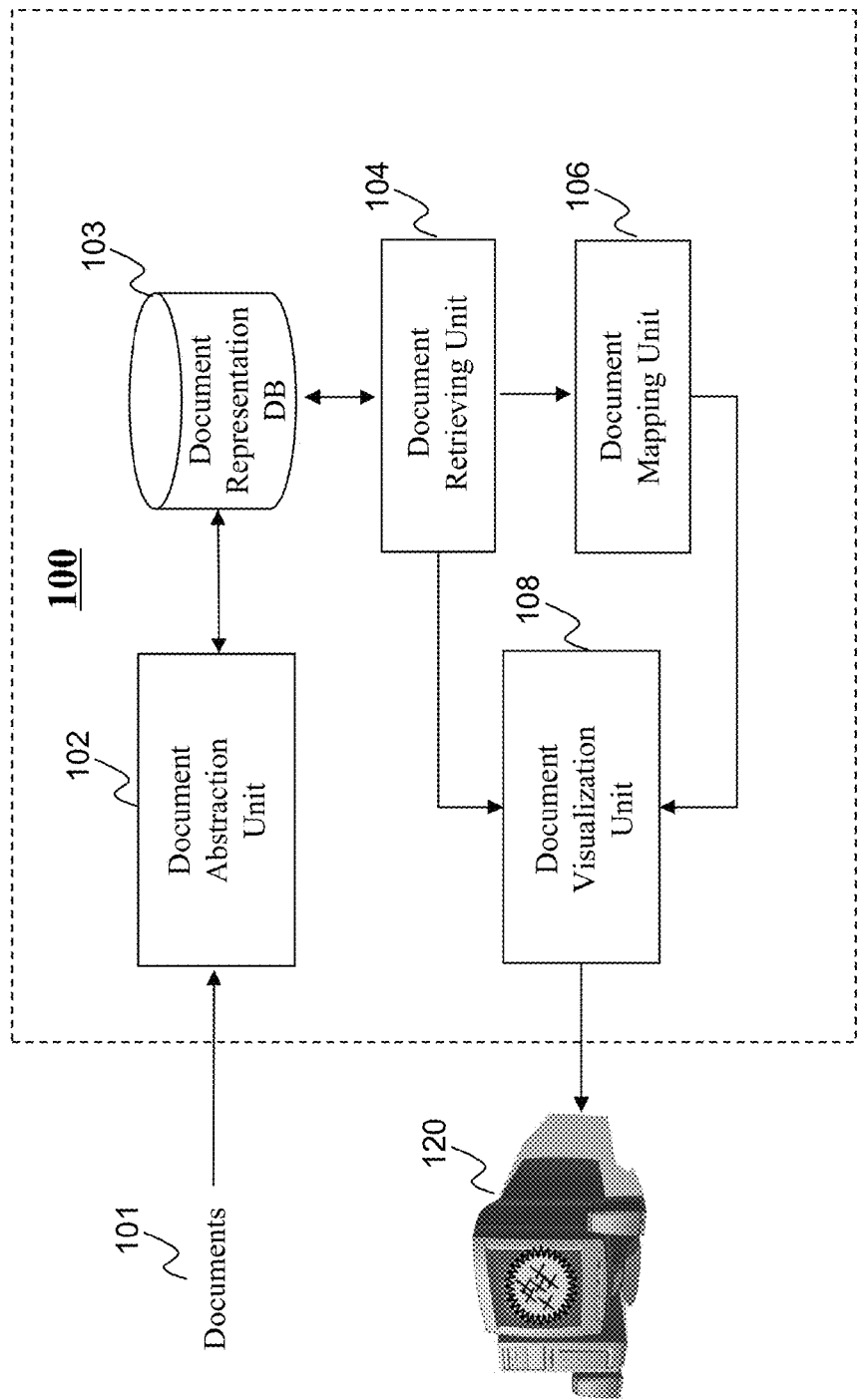
FIG. 1 is a block diagram illustrating an exemplary embodiment of a system for visualizing documents, in accordance with one embodiment of the present disclosure.

Reference will now be made in detail to the embodiments of the present disclosure, examples of which are illustrated in the accompanying drawings. While the present disclosure will be described in conjunction with the embodiments, it will be understood that they are not intended to limit the present disclosure to these embodiments. On the contrary, the present disclosure is intended to cover alternatives, modifications, and equivalents, which may be included within the spirit and scope of the present disclosure as defined by the appended claims.

In addition, in the following detailed description of embodiments of the present disclosure, numerous specific details are set forth in order to provide a thorough understanding of the present disclosure. However, it will be recognized by one of ordinary skill in the art that the present disclosure may be practiced without these specific details. In other instances, well-known methods, procedures, components, and circuits have not been described in detail as not to unnecessarily obscure aspects of the embodiments of the present disclosure.

Various embodiments in accordance with the present disclosure provide a method and a system for semantic information search and retrieval. More specifically, the method and system in various embodiments of the present disclosure relate to visualization of concepts contained in one or more documents. The documents may be in a result set in response to a user input query. User queries may be in the form of one or more keywords, one or more paragraphs of descriptive text, or one or more full text documents. User queries may also be in the form of document meta information, which includes but is not limited to the author, the affiliation, the ownership, the time of creation, etc.

The method and system in various embodiments of the present disclosure are described for helping users visually analyze a set of documents and find documents with the concepts of interest within a plurality of documents. The set of documents may be any large or small corpus of documents with text content, such as legal collections, archives of technical journals, corporate or personal archive of documents, Internet forum posts, text messages, or all text documents on the World Wide Web (Internet). The method and system in various embodiments of the present disclosure allows a user to perform a search for a plurality of documents retrieved from a set of documents based on the search, and to visualize the concepts covered in the retrieved documents. The retrieved documents may be rendered on a K-dimensional semantic map. The distance between any pair of documents on the map represents semantic relatedness of the documents, such that similar or related documents are close to one another on the map. Various regions on the map are labeled with concepts contained in documents in the underlying regions. The method and system in various embodiments of the present disclosure also allows a user to visualize the main concepts covered by a set of documents without entering a query, to browse and navigate to a subset of documents covering specific concepts of interest, and to perform iterative search, exploration, and analysis.

In accordance with various embodiments of the present disclosure, a dimension reduction technique is applied to each document to create one or more semantic compact codes that retain the meaning of the document and have much lower dimensionality than the term space. The compact representations of the documents are applied in a projecting process, during which documents that are more semantically related to each other are placed closer on the rendered K-dimensional map than those that are less related. Concepts are placed on the K-dimensional map based on the global distribution of documents containing the concepts.

Additional novel features will be set forth in part in the description which follows, and in part will become apparent to those skilled in the art upon examination of the following and the accompanying drawings or may be learned by production or operation of the examples.

FIG. 1 illustrates one exemplary embodiment of a system 100 for visualizing documents, in accordance with one embodiment of the present disclosure. The system 100 may include a document abstraction unit 102, a document representation database 103, a document retrieving unit 104, a document mapping unit 106, and a document visualization unit 108, in accordance with one embodiment of the present disclosure. The document abstraction unit 102 may be configured to receive a set of documents 101 and generate and archive an N-dimensional compact representation and a set of relevant concepts for each document in the document representation database 103. The document representation database 103 may be operatively coupled to the document abstraction unit 102 and the document retrieving unit 104. The document retrieving unit 104 may be configured to retrieve certain documents and the corresponding N-dimensional compact representations and relevant concepts, from the document representation database 103. The document mapping unit 106 may be operatively coupled to the document retrieving unit 104 and configured to project each of the retrieved documents to a point on a K-dimensional map based on its N-dimensional compact representation, and identify each region in the map where the density of projected document points associated with a concept is higher than a predetermined threshold. In some exemplary embodiments, the projected document points in the K-dimensional map maintain the relative distances among the retrieved documents in the N-dimensional space. In some exemplary embodiments, N is larger than K, and K is one of two and three. The document visualization unit 108 may be operatively coupled to the document retrieving unit 104 and the document mapping unit 106, and configured to render a map visualizing the retrieved documents and their associated concepts in each identified region.

In some exemplary embodiments, a display device 120 may be operatively coupled to the system 100. In an exemplary embodiment, a display device 120 may be operatively coupled to the document visualization unit 108 of the system 100, and configured to display the rendered map from the document visualization unit 108.

Figure 2:
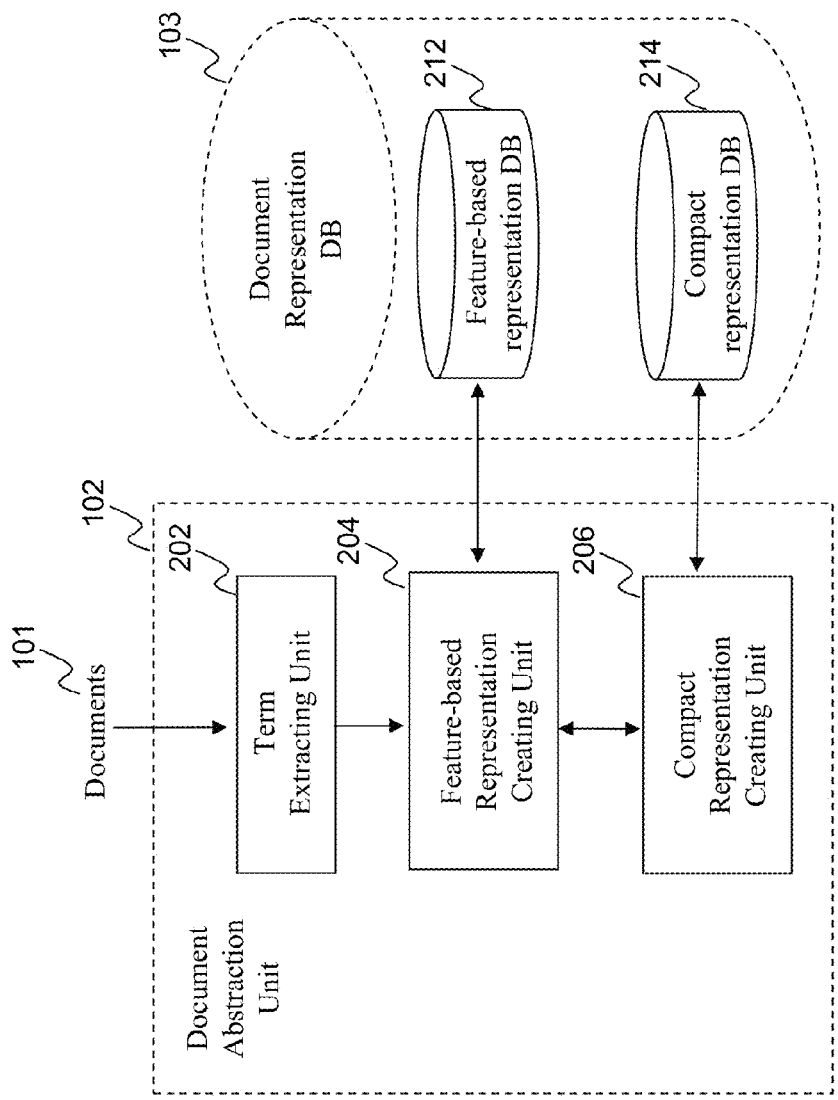
FIG. 2 is a block diagram illustrating an exemplary embodiment of the document abstraction unit and the document representation database, in accordance with one embodiment of the present disclosure.

FIG. 2 illustrates an exemplary embodiment of the document abstraction unit 102 and the document representation database 103 shown in FIG. 1, in accordance with one embodiment of the present disclosure. In this exemplary embodiment, the document abstraction unit 102 includes a term extracting unit 202, a feature-based representation creating unit 204, and a compact representation creating unit 206. In this exemplary embodiment, the document representation database 103 includes a feature-based representation database 212 and a compact representation database 214. In this exemplary embodiment, the term extracting unit 202 is configured to extract a plurality of terms from each of the set of documents 101 received by the document abstraction unit 102. In this exemplary embodiment, the feature-based representation creating unit 204 is operatively coupled to the term extracting unit 202 and the feature-based representation database 212, and configured to generate a feature-based representation for each of the set of documents 101 based on the extracted terms. The generated feature-based representations may be stored in the feature-based representation database 212. In this exemplary embodiment, the compact representation creating unit 206 is operatively coupled to the feature-based representation creating unit 204 and the compact representation database 214, and configured to generate, for each of the set of documents 101, an N-dimensional compact representation based on the feature-based representation of the document. The generated compact representations may be stored in the compact representation database 214. In this exemplary embodiment, the set of documents 101 is archived along with their respective feature-based representations and N-dimensional compact representations in the document representation database 103.

In some exemplary embodiments, a feature-based representation of a document may represent the document's features including, but not limited to, words, phrases, concepts, topics, or locations. In some exemplary embodiments, the feature-based representation is sparse and has a high dimensionality. There may be many possible features, and each document may only have meaningful (non-zero) values for a small number of the many possible features. The feature-based representation may be generated by splitting document text into words or tokens, converting words into word stems, and computing the relative information content of a word or phrase.

In some exemplary embodiments, the N-dimensional compact representation, generated based on the feature-based representation of a document, is denser and has a lower dimensionality than the feature-based representation. In some exemplary embodiments, all elements of the N-dimensional compact representation have meaningful values. Various dimensionality reduction methods can be used to compute the compact representation. Both the feature-based representation and the compact representation of a document are stored in a way to facilitate retrieval.

Figure 3:
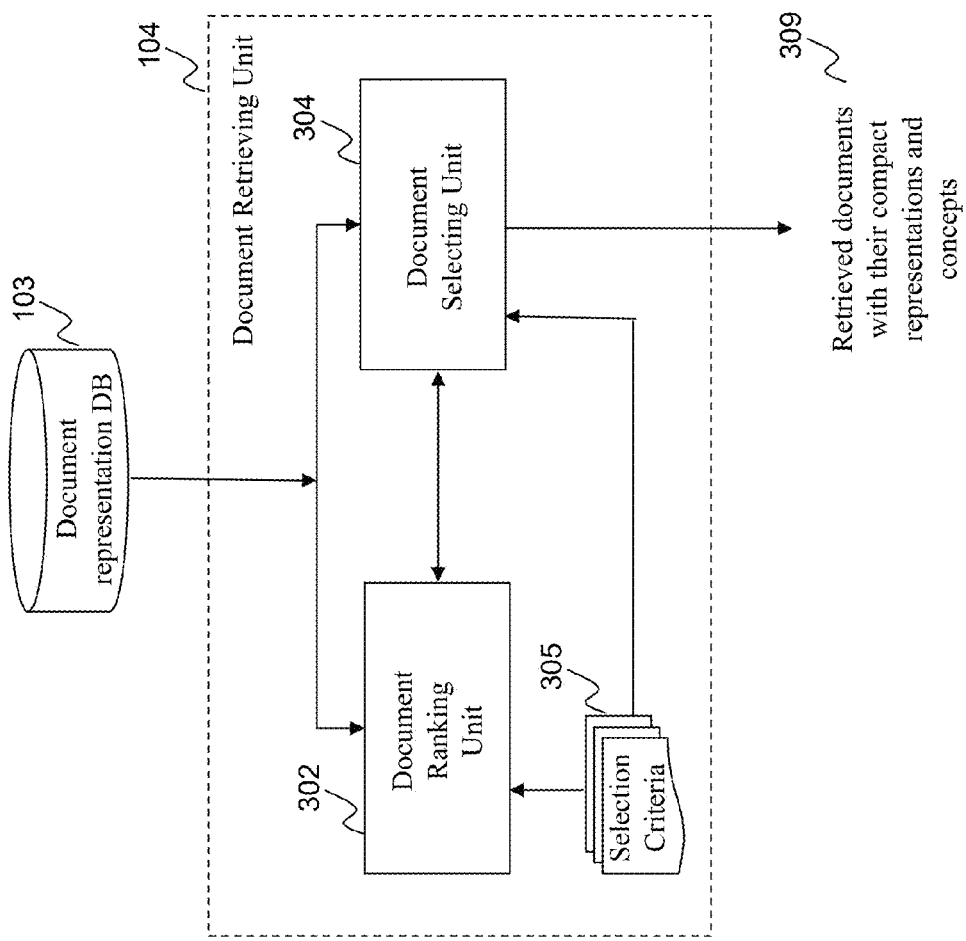
FIG. 3 is a block diagram illustrating an exemplary embodiment of the document retrieving unit, in accordance with one embodiment of the present disclosure.

FIG. 3 illustrates an exemplary embodiment of the document retrieving unit 104 shown in FIG. 1, in accordance with one embodiment of the present disclosure. In this exemplary embodiment, the document retrieving unit 104 includes a document ranking unit 302 and a document selecting unit 304. The document ranking unit 302 in this exemplary embodiment is operatively coupled to the document representation database 103 and configured to determine one or more metrics for each archived document based on some criteria stored in the document retrieving unit 104, and archive the metrics for each document as metadata with respect to the document in the document representation database 103. The document selecting unit 304 in this exemplary embodiment is operatively coupled to the document representation database 103 and the document ranking unit 302, and configured to retrieve certain documents and their corresponding N-dimensional compact representations and concepts based on the metrics from the document representation database 103. In this exemplary embodiment, the document retrieving unit 104 is configured to output the retrieved documents with their corresponding N-dimensional compact representations and concepts 309.

In some exemplary embodiments, the retrieved documents may be the complete set of archived documents in the document representation database 103, or a subset of archived documents in the document representation database 103. The subset may include the latest X number of documents in the database 103, or the documents containing the top Y concepts in the database 103.

Figure 4:
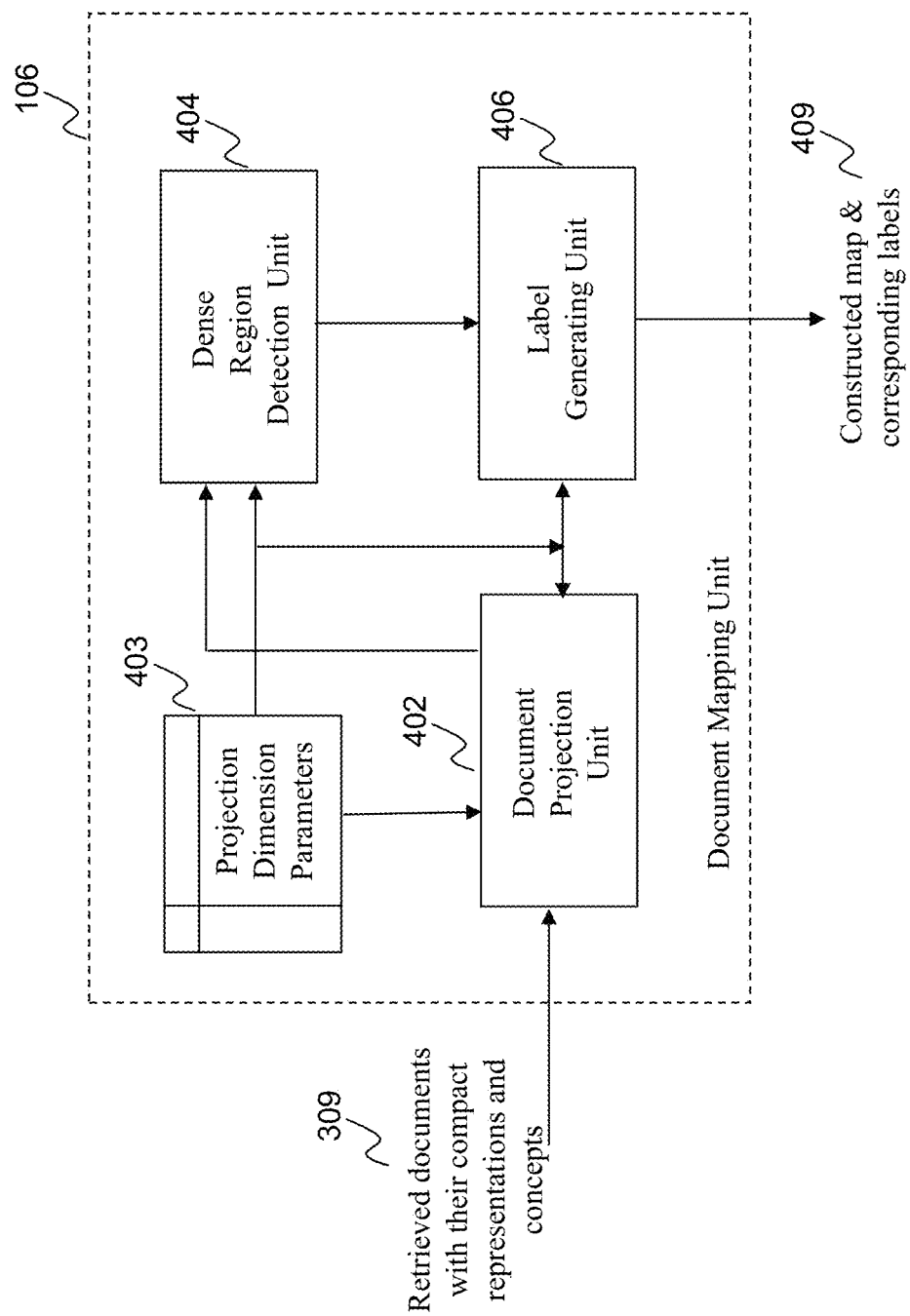
FIG. 4 is a block diagram illustrating an exemplary embodiment of the document mapping unit, in accordance with one embodiment of the present disclosure.

FIG. 4 is a block diagram illustrating an exemplary embodiment of the document mapping unit 106 shown in FIG. 1, in accordance with one embodiment of the present disclosure. In this exemplary embodiment, the document mapping unit 106 has a document projection unit 402, a dense region detection unit 404, and a label generating unit 406. The document projection unit 402 in this exemplary embodiment is configured to obtain certain documents, their corresponding N-dimensional compact representations, and concepts 309 associated with the received documents, and project each of the documents as a point on a K-dimensional map based on its N-dimensional compact representation. The dimensionality K may be determined based on the projection dimension parameters 403 stored in the document mapping unit 106. The projection dimension parameters 403 may include, e.g., two dimensional, three dimensional, determined based on, e.g., the number of points to be projected on to the map. For example, when the number of documents to be projected on the map is high so that it will be crowded if a two dimensional map is employed, a three dimensional map may be automatically used to visualize all the documents and associated labels. Such a choice of dimensionality may be determined by an administrator or automatically by the disclosed system. Additional information may also be used in determining the dimensionality of the map to be used. For example, some meta information of documents may be considered in determining the dimensionality. Such meta information may include, but is not limited to, the authors, the affiliations, and the document creation time. While the projected document points in the K-dimensional map maintain the relative distances among the retrieved documents in the N-dimensional space so that documents that are close together in the N-dimensional space are also close together in the K-dimensional map space, the projected document points may also be projected to satisfy an additional dimension, e.g., publication date, along a separate dimension.

The dense region detection unit 404 in this exemplary embodiment is operatively coupled to the document projection unit 402 and configured to identify each region in the K-dimensional map where the density of projected document points associated with a concept is higher than a predetermined threshold. In some exemplary embodiments, each region has one or more concepts each associated with document points in the region that has a density larger than the predetermined threshold. The dense region detection unit 404 may also determine the density based on the dimension of the K-dimensional map. As discussed above, the dimensionality of the K-dimensional map can be two or three or even higher, depending on various considerations such as the number of points or other meta information. Once the dimensionality is known, the density may be determined accordingly. For example, the density in a two dimensional map may be the number of points that share the same concept in a squared area. But in a three dimensional map, the density may be measured based on the number of points in a unit cube.

The label generating unit 406 in this exemplary embodiment is operatively coupled to the document projection unit 402 and the dense region detection unit 404, and configured to generate a label for each concept associating with document points whose density is larger than the predetermined threshold in each region identified. Each of such generated labels corresponds to a word, words, a phrase, a string of characters or numbers, or an icon-like item describing the associated concept. In some embodiments, the label generating unit 406 may be configured to generate different labels in different styles depending on some specified criteria. For example, a region having a denser population of document points sharing a particular concept, the label for the shared concept may be deemed as more significant than another label representing a concept shared by fewer documents. In this case, the label representing a more significant concept may be rendered with more outstanding features such as boldfaced, a darker color, or a larger font size. In some embodiments, there may be multiple levels of significance in rendering labels, each of which may be associated with a certain style. For example, underlining may be used for labels representing less significant concepts as compared with boldfaced labels representing the most significant concepts. Red color may be more significant than blue color. In addition to determining the significance of a concept based on the density of points, the size of a region that contains documents points sharing the same concept may also be used to assess the significance of the concept.

In some embodiments, the K-dimensional map may be manipulated by a user via, e.g., a user interface that may be implemented to allow a user to manipulate the K-dimensional map or some of any part thereof For example, via some user interface, some of the projected document points or rendered labels on the K-dimensional map may be made actionable to allow a user to activate information associated therewith. For example, when a projected document point is activated, information associated with the document may be visualized. A label showing a concept may also be activated so that additional information related to the concept may be displayed. A projected document point or a rendered label can be activated under different conditions. For example, a document/label may be activated when a user places a cursor near its projected document point or the label; a user may perform a click when the cursor is near a projected document point or a rendered label; or when a cursor is placed in a region in the K-dimensional map that is labeled. One or more document points/labels may also be activated when a user selects a region in the K-dimensional map that may include one or more document points and/or one or more labels. A summary of information in the selected document points/labels may be presented to the user. Other interaction means may also be employed such as a touch screen, a scroll wheel, a motion sensitive device, or a virtual touch means interacting with virtual display devices, e.g., virtual display glasses, to be used to activate document points and/or rendered labels. In some situations, the manipulation of parts of a K-dimensional map may be performed within the K-dimensional map as described above. In other embodiments, the manipulation of the K-dimensional map or any part thereof may be via some interface means external to the K-dimensional map. For example, certain buttons implemented in a user interface may be used to manipulate certain parts of the K-dimensional map even though such buttons may reside outside of the K-dimensional map. Different implementations may be employed to allow a user to activate or manipulate the K-dimensional map or any part thereof and they all fall within the scope of the present teaching. In some embodiments, interactions with or manipulation of a K-dimensional map or any part thereof involving a user (whether initiated by the user or not) may be used to generate automatically a query that estimates the user's intent or interest. Such an automatically generated query may then be used to retrieve additional documents that match with the query so as to help the user to further explore the documents. This is further discussed with reference to FIG. 6 and FIG. 13.

In some exemplary embodiments, a dimension reduction algorithm may be employed to project documents on the K-dimensional map where each document is represented by its feature-based representation and/or compact representation that has a dimensionality higher than K. Mapping feature-based representations or compact representations of documents to a K-dimensional space requires dimension reduction. Such mapping needs to be done in such a way that the relative distances among these documents measured based on their feature-based representations or compact representations are preserved in the K-dimensional map. In accordance with various exemplary embodiments, the dimension reduction algorithm may be any existing, known, or future technologies. Examples of existing dimension reduction algorithms include t-distributed stochastic neighbor embedding (t-SNE), elastic embedding, or locally linear embedding approach.

Figure 5:
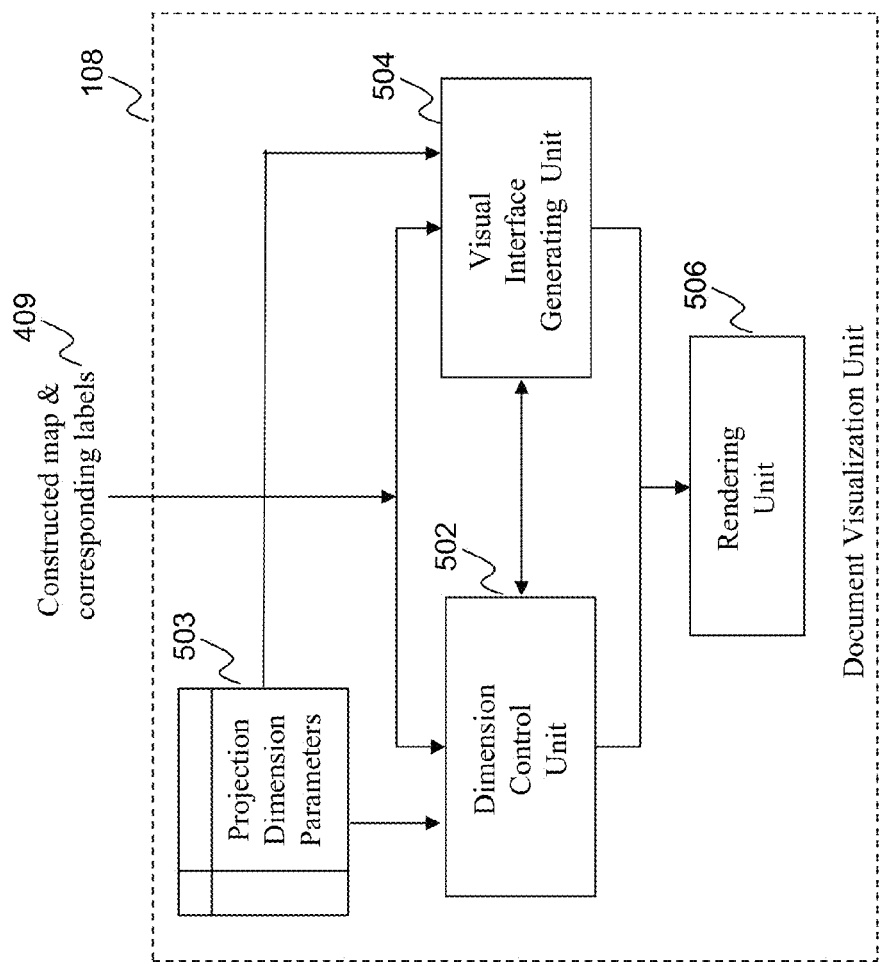
FIG. 5 is a block diagram illustrating an exemplary embodiment of the document visualization unit, in accordance with one embodiment of the present disclosure.

FIG. 5 is a block diagram illustrating an exemplary embodiment of the document visualization unit 108 shown in FIG. 1, in accordance with one embodiment of the present disclosure. In this exemplary embodiment, the document visualization unit 108 has a dimension control unit 502, a visual interface generating unit 504, and a rendering unit 506. The dimension control unit 502 in this exemplary embodiment is configured to receive the constructed K-dimensional map with corresponding labels, and control the dimension of the map based on certain document information or labels, as well as the projection dimension parameters 503 stored in the document visualization unit 108. The visual interface generating unit 504 in this exemplary embodiment is operatively coupled to the dimension control unit 502, and configured to receive the constructed K-dimensional map with corresponding labels and generate a visual interface based on certain document information or labels. The visual interface generating unit 504 in this exemplary embodiment generates a visual interface based on the projection dimension parameters 503 stored in the document visualization unit 108. The visual interface in this exemplary embodiment is generated to allow a user to interactively control documents and/or labels corresponding to concepts associated with the documents to be rendered on the K-dimensional map. The rendering unit 506 in this exemplary embodiment is operatively coupled to the dimension control unit 502 and the visual interface generating unit 504, and configured to render the visualized map. In this exemplary embodiment, the document visualization unit 108 is configured to output the rendered map visualizing the retrieved documents and their associated concepts in each identified region.

In one exemplary embodiment, document points projected on the K-dimensional map are represented by colored marks or dots, where the color of each projection may represent some document meta information, which includes, but is not limited to, the document creation time, the author of the document, and the owner of the document. For example, a particular color may be designated to denote documents that are from best seller authors, with other document points corresponding to other colors.

In some exemplary embodiments, a projection dimension parameter (see 503) may be used to represent a single dimension in a K-dimensional map. For example, in a three dimensional map (K=3), a dimension parameter corresponding to feature "year" may be used to denote the 3rd dimension Z. In this way, documents are first projected to a two dimensional space denoted by X and Y based on semantic distances among documents as described above, and then projected along the Z dimension based on the year information associated with the documents. This may be controlled by the dimension control unit 502. The projection dimension parameters 503 may also include other meta information of documents or attributes associated with labels representing different concepts. As discussed above, the meta information includes but is not limited to, the authors, the affiliations, and the document creation time. Examples of attributes of a label relating to a concept may include the number of documents associating with the concept in each region or the size of the region encompassed by the concept that the label represents.

In some embodiments, the disclosed teaching may also provide a user the capability of interact with or manipulation of the K-dimensional map to control the visualization of documents. For example, a user may be provided with an interface by which a user can manipulate the documents to be rendered in the K-dimensional map and/or the ways how documents and the labels for concepts associated with the documents to be rendered on the K-dimensional map. In some embodiments, a specific dimension represented by a single attribute may be made interactive, a user may be provided with the means to filter or highlight documents via a, e.g., a slider, or zoom in or out of a particular region of the map to review the underlying documents. Documents selected by a user based on other means, e.g., ranked list of documents or personal portfolio, outside the K-dimensional map can be flagged on the map if available. The K-dimensional map may be visually adjusted on-the-fly based on the user's interaction. For example, if zoom in is desired, the region being zoomed in may be rendered with an enlarged visual appearance and all points and labels in that region may then be rendered with proportionally appropriate sizes. Similarly, zoom out may also be implemented. A specific dimension represented by a single attribute of documents can be replaced using another attribute selected by a user among a list of available attributes associated with documents. When K is larger than 2, to visualize documents in different 3D regions, the K-dimensional map may also be rotated, tilted, flipped, in addition to zooming in and out so that a user can visualize any specific 3D region in more detail. In some embodiments, a single attribute of documents or labels, which is not used as a dimension in a K dimensional map, may be controlled via, e.g., a slider, by a user, to modify the K dimensional map on the fly to create an animation effect. For example, when the "year" attribute of documents is changed, the K-dimensional map may be updated with different document points that satisfy the updated "year" criterion. Multiple attributes of documents or labels can be combined to control documents rendered on the K-dimensional map.

Figure 6:
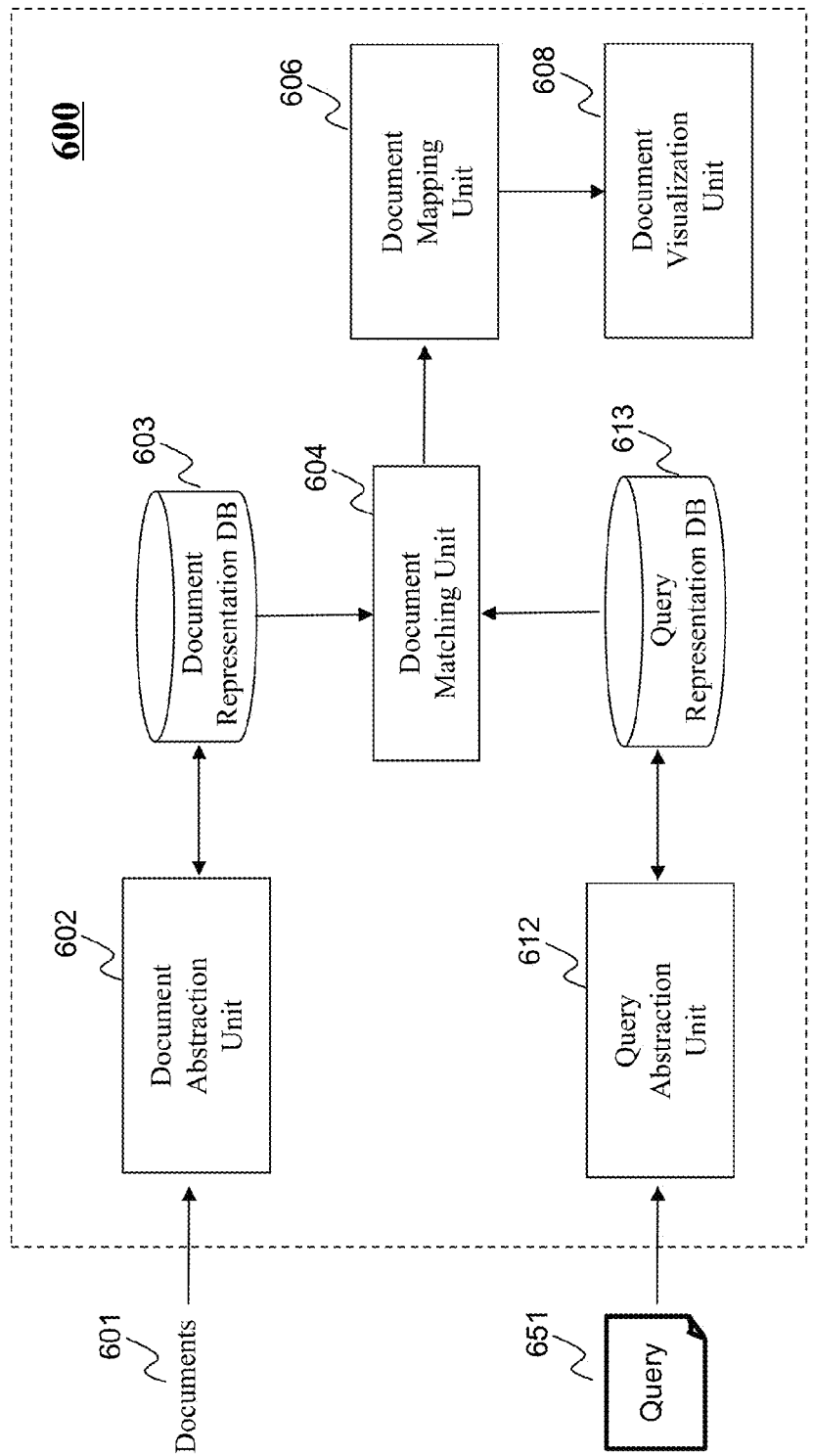
FIG. 6 is a block diagram illustrating an exemplary embodiment of another system for visualizing documents, in accordance with one embodiment of the present disclosure.

FIG. 6 is a block diagram illustrating an exemplary embodiment of another system 600 for visualizing documents, in accordance with one embodiment of the present disclosure. The system 600 in this exemplary embodiment includes a document abstraction unit 602, a document representation database 603, a document matching unit 604, a document mapping unit 606, a document visualization unit 608, a query abstraction unit 612, and a query representation database 613. The document abstraction unit 602 in this exemplary embodiment is configured to receive a set of documents 601, generate, and archive an N-dimensional compact representation for each document in the document representation database 603. The query abstraction unit 612 is configured to receive a query 651, generate, and archive an N-dimensional compact representation for the query 651 in the query representation database 613. The document representation database 603 in this exemplary embodiment is operatively coupled to the document abstraction unit 602 and the document matching unit 604. The query representation database 613 in this exemplary embodiment is operatively coupled to the query abstraction unit 612 and the document matching unit 604. The document matching unit 604 in this exemplary embodiment is configured to retrieve certain documents associated with concepts by matching the query 651 with the archived documents. The matching may be performed based on, e.g., their respective feature-based representations, compact representations, and/or other meta information. The document mapping unit 606 in this exemplary embodiment is operatively coupled to the document matching unit 604 and configured to project each of the documents retrieved based on a match to a point on a K-dimensional map based on, e.g., the N-dimensional compact representation of the document. Once the documents are mapped to the K-dimensional map, the document mapping unit 606 is also configured to identify each region in the map where the density of projected document points associated with a concept is higher than a predetermined threshold. In some exemplary embodiments, the projected document points in the K-dimensional map maintain the relative distances among the retrieved documents in the N-dimensional space. In general, N is larger than K, and K may be either two or three. The document visualization unit 608 in this exemplary embodiment is operatively coupled to the document mapping unit 606, and configured to transmit the K-dimensional map visualizing the documents retrieved based on the query and their associated concepts in each identified region, as a response to the query 651.

In some exemplary embodiments, the system 600 processes a query as below. First, the received query is split into query clauses. Then, each query clause is analyzed by computing a feature-based representation and a compact representation for the query clause. Key features from each query clause are utilized to identify possibly relevant documents in the document database. Each possibly relevant document so identified is assigned a score based on a distance between the feature-based and compact representation of a query clause and that of the document. The scores for all query clauses are then combined. In case it is desired to use documents with higher scores as more relevant, the documents with a certain number of highest relevance scores may be deemed as the query result. On the other hand, in case it is desirable to use documents satisfying certain time requirements (e.g., more recent in time), the documents retrieved that have more recent time stamps may be returned as query result. In some exemplary embodiments, the query received by the system 600 may be from a user. In some embodiments, the query received may be automatically generated based on previous interactions of a user with a K-dimensional map, which is described above with reference to the document mapping unit 106.

In some exemplary embodiments, the K-dimensional map generated for the query result in response to a query may further be used for an interactive discovery and analysis process. In some embodiments, features are made available to a K-dimensional map generated with respect to a set of documents, whether the set of documents is a result of a query or not. An interactive interface may be implemented that allows the use of interaction tools such as a mouse, a scroll wheel, a sliding zoom control, or a touch screen with a pinching motion to allow a user to perform certain interactions such as zoom into a specific region of the map. The user may use a mouse to click and drag, or if using a touchscreen device, use a finger to touch and drag, to see different regions at the same level of magnification. In some exemplary embodiments, the user may also control what is present in the map by, e.g., modifying a previous query by adding, emphasizing, or discounting concepts which are represented by labels on the map. In addition, the user may add, emphasize, or discount documents on the map. In the situation where there is no initial query present, the previous query may be treated as "empty". A query can be generated via actions such as emphasizing or discounting certain concepts or documents on the map. In another exemplary embodiment, the user interaction with the map may be utilized to trigger automated generation of a refined query, as will be detailed below in reference to FIG. 13.

In one exemplary embodiment, documents may be represented by colored marks or points on the K-dimensional map, where the color may signify some aspect of the underlying document such as its relevance to the user's query. In another exemplary embodiment, the relevance of the document to the user's query can be visualized by adding a separate dimension to the K-dimensional map, which results in a (K+1)-dimensional map, in which the documents are projected in the K+1-dimensional map and along the additional dimension, documents are projected in accordance with their relevance to the query. In another exemplary embodiment, the user may input, through some user interface, certain criteria as to how document points projected on the K-dimensional map can be marked in certain ways. For example, a user may specify that the document projected on to the K-dimensional map are colored according to how recent they are, e.g., red denoting the most recent, and black denoting the least recent, etc.

Figure 7:
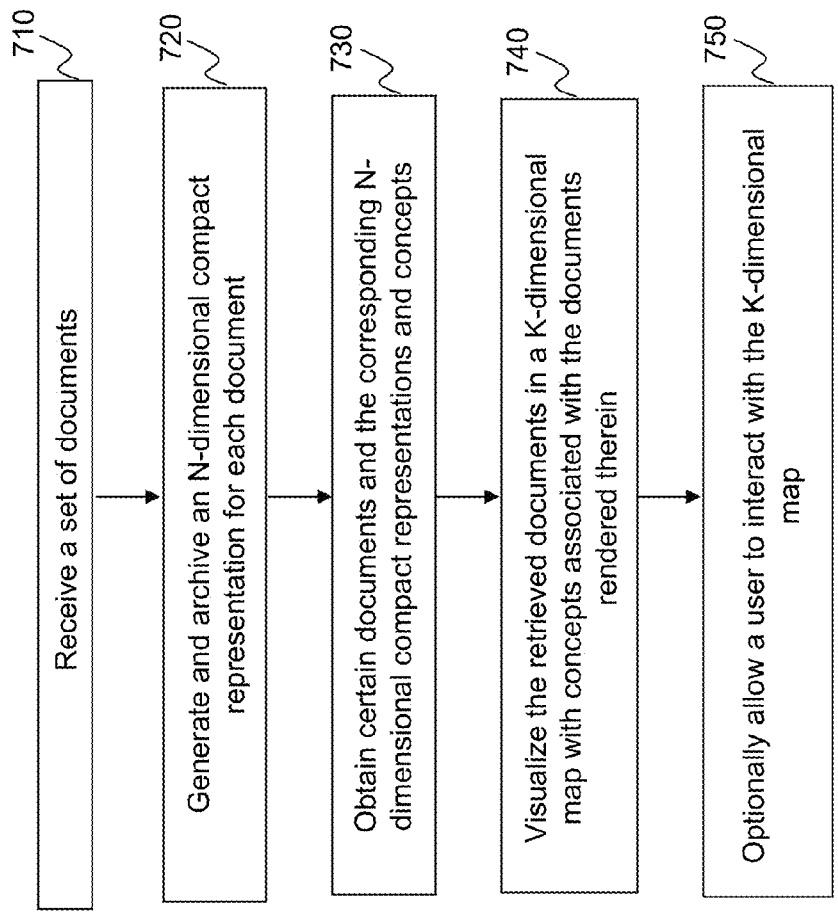
FIG. 7 is a flow chart illustrating an exemplary embodiment of a method for visualizing documents, in accordance with one embodiment of the present disclosure.

FIG. 7 is a flow chart illustrating an exemplary embodiment of a method for visualizing documents, in accordance with one embodiment of the present disclosure. This exemplary process corresponds to the flow for visualizing documents performed by the system 100, shown in FIG. 1. Beginning at 710, a set of documents is received. Proceeding to 720, an N-dimensional compact representation for each of the set of documents is generated and archived in, e.g., the document representation database 103 of the system 100. As described above, 710 and 720 may be performed by, e.g., the document abstraction unit 102 of the system 100. Moving to 730, certain documents are obtained with their corresponding N-dimensional compact representations and concepts. As described above, 730 may be performed by, e.g., the document retrieving unit 104 of the system 100. In some embodiments, the documents may be obtained at 730 based on some criteria. In some situations, such criteria may be that the documents are from a certain storage. In this exemplary embodiment, the initial round of documents access is not guided by a user's provided query. With respect to the embodiment depicted in FIG. 6 and its process described in FIG. 12, the initial retrieval of documents was triggered by a query received from a user. Proceeding to 740, the retrieved documents are visualized via a K-dimensional map generated based on the N-dimensional compact representations of the underlying documents. This visualization is performed by the document mapping unit 106 and the document visualization unit 108. The details of the visualization are discussed with respect to FIG. 10. Once the K-dimensional map is generated to allow a user to visualize the documents, the present teaching optionally provides, at 750, the means to allow a user to interact with the K-dimensional map. As will be discussed below with respect to FIG. 13, based on such interactions, the present teaching is capable of automatically generating a query, aiming at estimating the intent or interests of the user, in order to assist the user to quickly focus on the documents of interests.

Figure 8:
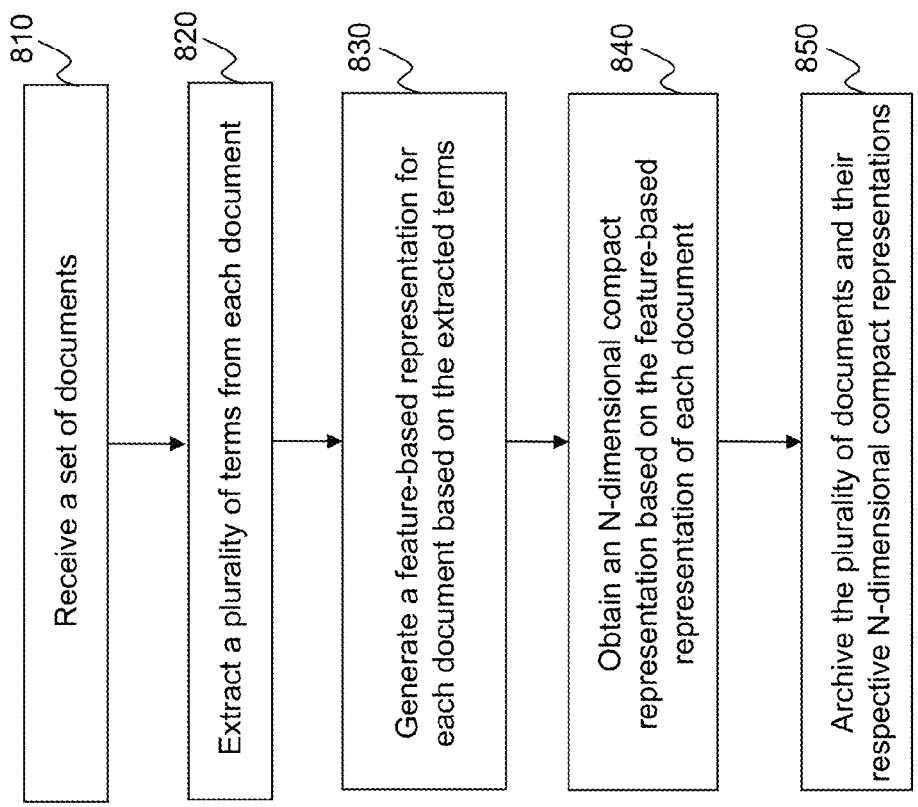
FIG. 8 is a flow chart illustrating an exemplary process performed by a document abstraction unit, in accordance with one embodiment of the present disclosure.

FIG. 8 is a flow chart illustrating an exemplary process performed by the document abstraction unit 102, in accordance with one embodiment of the present disclosure. Beginning at 810, a set of documents is received. Proceeding to 820, a plurality of terms is extracted from each document. As described above, 810 and 820 may be performed by, e.g., the term extracting unit 202 of the document abstraction unit 102. In an exemplary embodiment, a PDF document received at the term extracting unit 202 may be processed with a PDF-to-text conversion application. Then, a stream of word-stem tokens may be obtained by dividing the text into words, converting words to lowercase word stems, and discarding punctuation.

Moving to 830, a feature-based representation for each document is generated based on the extracted terms. As described above, 830 may be performed by, e.g., the feature-based representation creating unit 204 of the document abstraction unit 102. In one exemplary embodiment, a feature-based representation is created by counting the number of times each unique word stem occurs. The dimensionality of the feature-based representation is the word-stem vocabulary of the entire corpus. In another exemplary embodiment, a feature-based representation is created by counting the number of times each unique word stem occurs, and then multiplying the number by the inverse document frequency, i.e., the reciprocal of the log of fraction of the corpus in which the word stem occurs. In some exemplary embodiments, a language model is trained on the corpus of documents, and the information content of each word stem occurrence is computed based on this language model. The information contents for all occurrences of each unique word stem are summed and normalized to form the feature-based representation of the document. In accordance with various exemplary embodiments, models for constructing a feature-based representation may include features such as n-grams and topics.

Proceeding to 840, an N-dimensional compact representation is obtained for each document based on its feature-based representation. As described above, 840 may be performed by, e.g., the compact representation creating unit 206 of the document abstraction unit 102 in connection with the feature-based representation database 212. In some exemplary embodiments, the feature-based representation may be based on to create a K-dimensional representation for each document. In other exemplary embodiments, an intermediate compact representation is created from the feature-based representation to be mapped to a K-dimensional representation for each document. According to one exemplary embodiment, a deep belief network is trained on the corpus of documents, using an information-maximizing subset of the corpus vocabulary as input features. The size of the input layer of the deep belief network is chosen according to the tolerance for training time. The size of the code layer determines the dimensionality of the compact representation. According to another exemplary embodiment, the compact representation is created by training a Latent Dirichlet Allocation (LDA) model from the feature-based representations. The compact representation may then be created by computing the conditional probabilities of each topic in the LDA model, given the document feature-based representation.

Moving to 850, the set of documents are archived with their respective N-dimensional compact representations. As described above, 850 may be performed by, e.g., the compact representation creating unit 206 of the document abstraction unit 102 in connection with the compact representation database 214.

Figure 9:
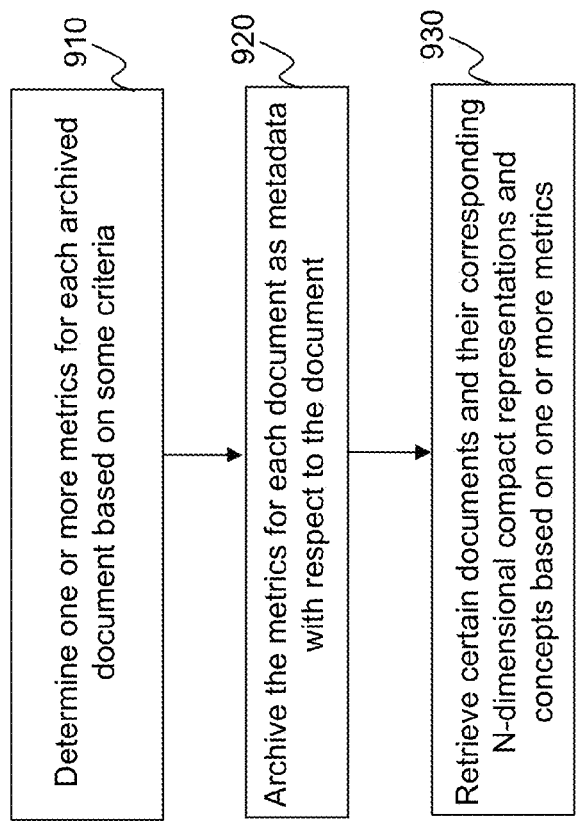
FIG. 9 is a flow chart illustrating an exemplary process performed by a document retrieving unit, in accordance with one embodiment of the present disclosure.

FIG. 9 is a flow chart illustrating an exemplary process performed by the document retrieving unit 104, in accordance with one embodiment of the present disclosure. Beginning at 910, one or more metrics are determined for each archived document based on some criteria. Proceeding to 920, the metrics for each document are archived as metadata with respect to the document. As described above, 910 and 920 may be performed by, e.g., the document ranking unit 302 of the document retrieving unit 104. Moving to 930, certain documents are retrieved with their corresponding N-dimensional compact representations and concepts based on the metrics. As described above, 930 may be performed by, e.g., the document selecting unit 304 of the document retrieving unit 104.

Figure 10:
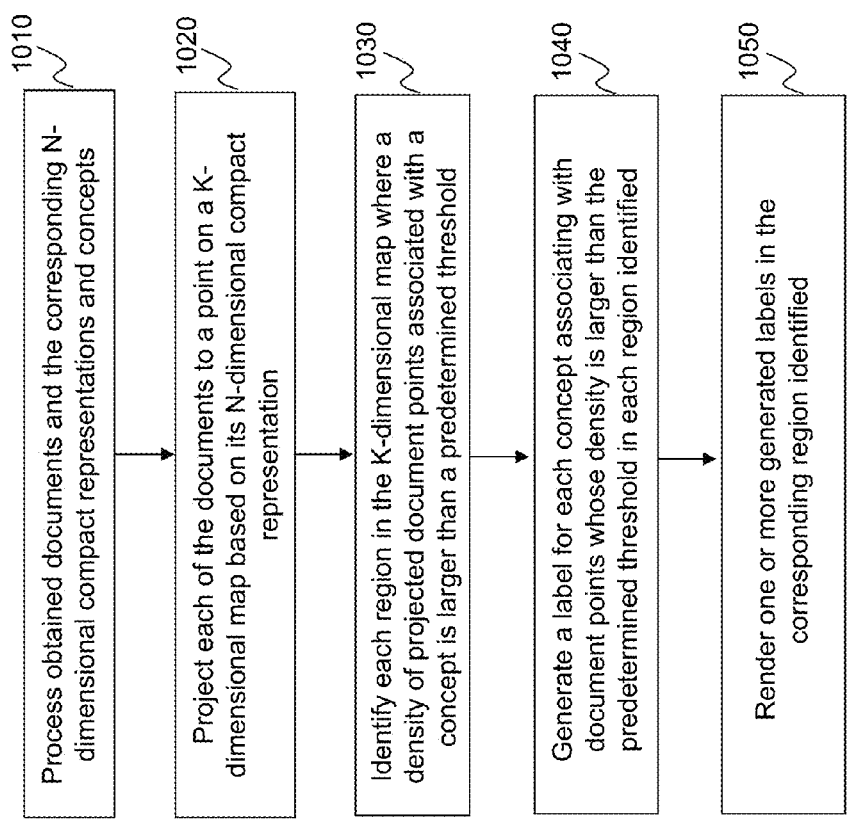
FIG. 10 is a flow chart illustrating an exemplary process performed by a document mapping unit, in accordance with one embodiment of the present disclosure.

FIG. 10 is a flow chart illustrating an exemplary process of visualizing a plurality of documents on a K-dimensional map, in accordance with one embodiment of the present disclosure. As discussed above with respect to FIG. 7, the visualization process is performed by the document mapping unit 106 and the document visualization unit 108. Beginning at 1010, the documents obtained are processed, including their corresponding N-dimensional compact representations and concepts embedded therein. To visualize the documents, each of the documents is projected, at 1020, to a point on a K-dimensional map based on its N-dimensional compact representation. As described above, 1010 and 1020 may be performed by, e.g., the document projection unit 402 of the document mapping unit 106. In some exemplary embodiments, the projected document points in the K-dimensional map maintain the relative distances among the retrieved documents in the N-dimensional space. In some exemplary embodiments, N is in general larger than K. In most embodiments, K can be either two or three. In some situations, K can also be four. A four-dimensional map can be either an extension of a three dimensional map, e.g., a series of three dimensional maps along a fourth axis, or structured as an integrated map rendered using any existing or future technologies.

When documents are projected on to the K-dimensional map, each region in the K-dimensional map is identified, at 1030, where the density of projected document points associated with a concept is higher than a predetermined threshold. As described above, this may be performed by, e.g., the dense region detection unit 404 of the document mapping unit 106. The K-dimensional map is generated to allow a user to visualize the retrieved documents in a non-linear and high efficient manner. In achieving so, not only the documents but also the concepts associated therewith are to be rendered in the K-dimensional map. For each such region identified, a label is generated, at 1040, for each concept associated with document points representing documents that include the concept. This may yield one or more labels that need to be visualized on the K-dimensional map to annotate documents implying different concepts. Such generated labels are then rendered in their corresponding regions. As described above, 1040 and 1050 may be performed by, e.g., the label generating unit 406 of the document mapping unit 106.

In some embodiments, the K-dimensional map may also be generated using a different approach (not shown in figures). For example, instead of projecting documents into the map as documents points first and then detecting the regions associated with concepts in the K-dimensional map that have an adequate level of density of document points embedded with the concept, the present teaching may also generate a K-dimensional map in the following manner. First, one or more subspaces in the N-dimensional space (instead of in the K-dimensional space) in which the density of documents associated with a concept is higher than a predetermined threshold. Documents corresponding to each of such subspaces are identified during the course of identifying the underlying subspace. To generate a K-dimensional map, the identified subspaces in the N-dimensional space as well as the documents associated with each of such subspaces are projected on a K-dimensional map. For instance, each identified N-dimensional subspace may first be projected into a corresponding K-dimensional region on the K-dimensional map and then each document identified as being embedded with a concept corresponding to projected subspace is projected as a point in the corresponding region on the K-dimensional map based on its N-dimensional compact representation. Any other ways to map the subspaces and the documents associated therewith may be used to map them on the K-dimensional map to maintain the relative distances among them in the N-dimensional space. The projected subspaces may be mapped on the K-dimensional map along with their underlying concepts associated therewith. In this alternative embodiment, both regions associated with different concepts and the document points projected therein are mapped so as to maintain the relative distances among the corresponding subspaces and the projected documents in the N-dimensional space. Similarly, a label for each concept may then be generated for each projected region and rendered on the K-dimensional map.

In some exemplary embodiments, the font size and the color of a label for a concept reflect respectively the size of the region and the density of documents associating with the concept in the underlying region, to clearly illustrate the main concepts contained in the document set, how concepts relate to each other, and how documents relate to concepts. In some exemplary embodiments, in each region identified, a label generated for a concept associating with a higher percentage of documents in the region, is rendered with a more outstanding feature. The more outstanding feature may include at least one of a darker color determined based on the density of documents associated with the concept and larger font size determined based on the size of the region.

In some exemplary embodiments, some or all projected document points on the K-dimensional map can be made actionable so that a user can activate a display of information associated with the underlying document. In some exemplary embodiments, some or all rendered labels on the K-dimensional map may be made actionable to activate a display of information related to the concept associated with the label. In some exemplary embodiments, a projected document point and/or a rendered label can be activated under different conditions. For instance, a document point and/or a label may be activated when a cursor is placed nearby; a document point and/or a label may also be activated when a cursor placed thereon is clicked; a marked region may also be activated when a cursor is placed within the region in the K-dimensional map.

In one exemplary embodiment, each label is placed on the map such that the position and size of the label indicate the position and size of the region in which projected document points related to the label are located. In this exemplary embodiment, a user may have high confidence that when selecting a particular document, the document will relate, in a semantic or conceptual sense, to the labels which are nearby. Further, the user in this exemplary embodiment may quickly get a sense of the main topics in the set of documents by observing the larger labels in the visualized map.

In one exemplary embodiment, the top several features from the feature-based representation are stored for each of the retrieved documents. A model can be fit to the documents containing each feature to identify the positions and regions in which the feature occurs. For example, the positions in a K-dimensional map of documents containing a feature may be modeled by a Gaussian distribution with random noise. When the model is fit to the data based on, e.g., expectation-maximization, the position and variance of the Gaussian distribution define the region in which the feature occurs.

Figure 11:
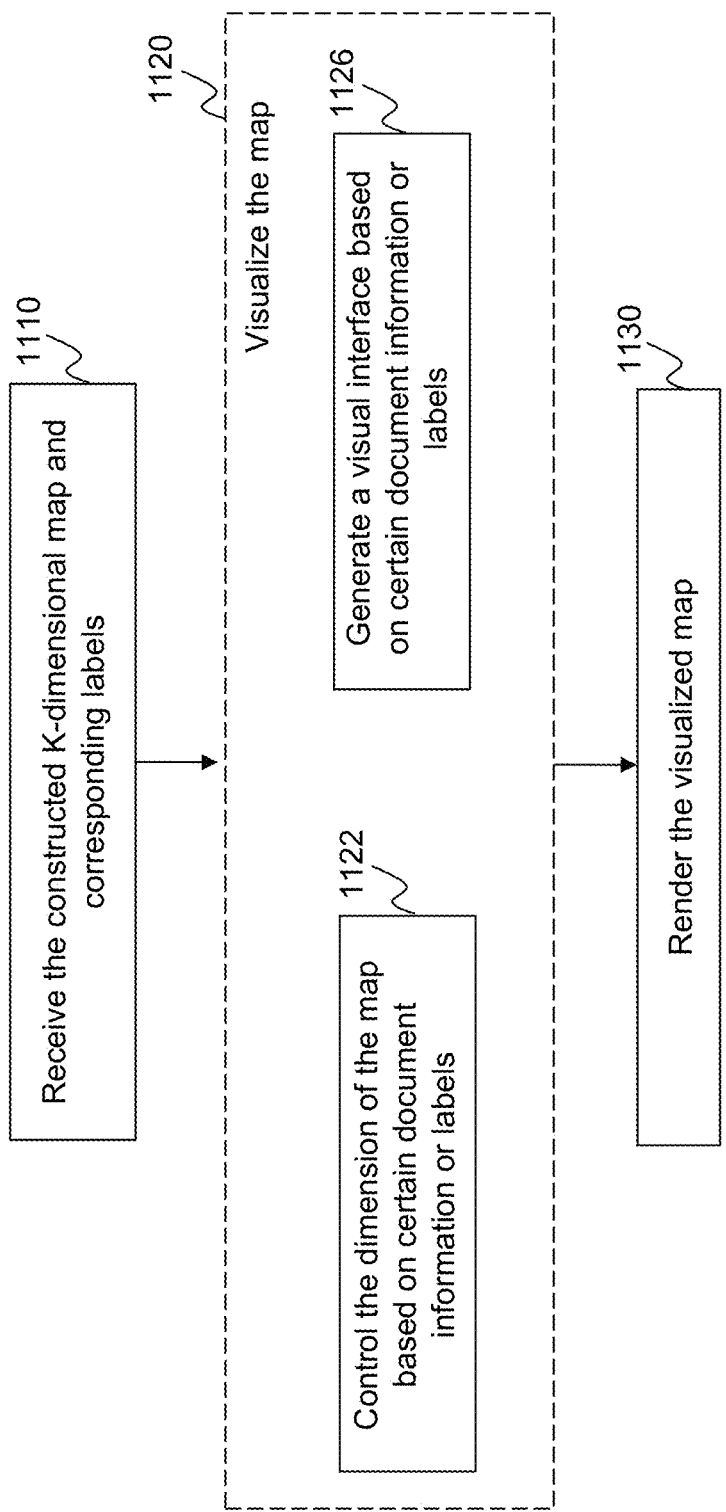
FIG. 11 is a flow chart illustrating an exemplary process performed by a document visualization unit, in accordance with one embodiment of the present disclosure.

FIG. 11 is a flow chart illustrating an exemplary process performed by the document visualization unit 108, in accordance with one embodiment of the present disclosure. Beginning at 1110, the constructed K-dimensional map and corresponding labels are received. Proceeding to 1120, the K-dimensional map is visualized by either 1122 or 1126, or both. At 1122, the dimension of the map is controlled based on certain document information or labels. At 1126, a visual interface is generated based on certain document information or labels. As described above, 1110 and 1122 may be performed by, e.g., the dimension control unit 502 of the document visualization unit 108. As described above, 1110 and 1126 may be performed by, e.g., the visual interface generating unit 504 of the document visualization unit 108. Moving to 1130, the visualized map is rendered. As described above, 1130 may be performed by, e.g., the rendering unit 506 of the document visualization unit 108.

Figure 12:
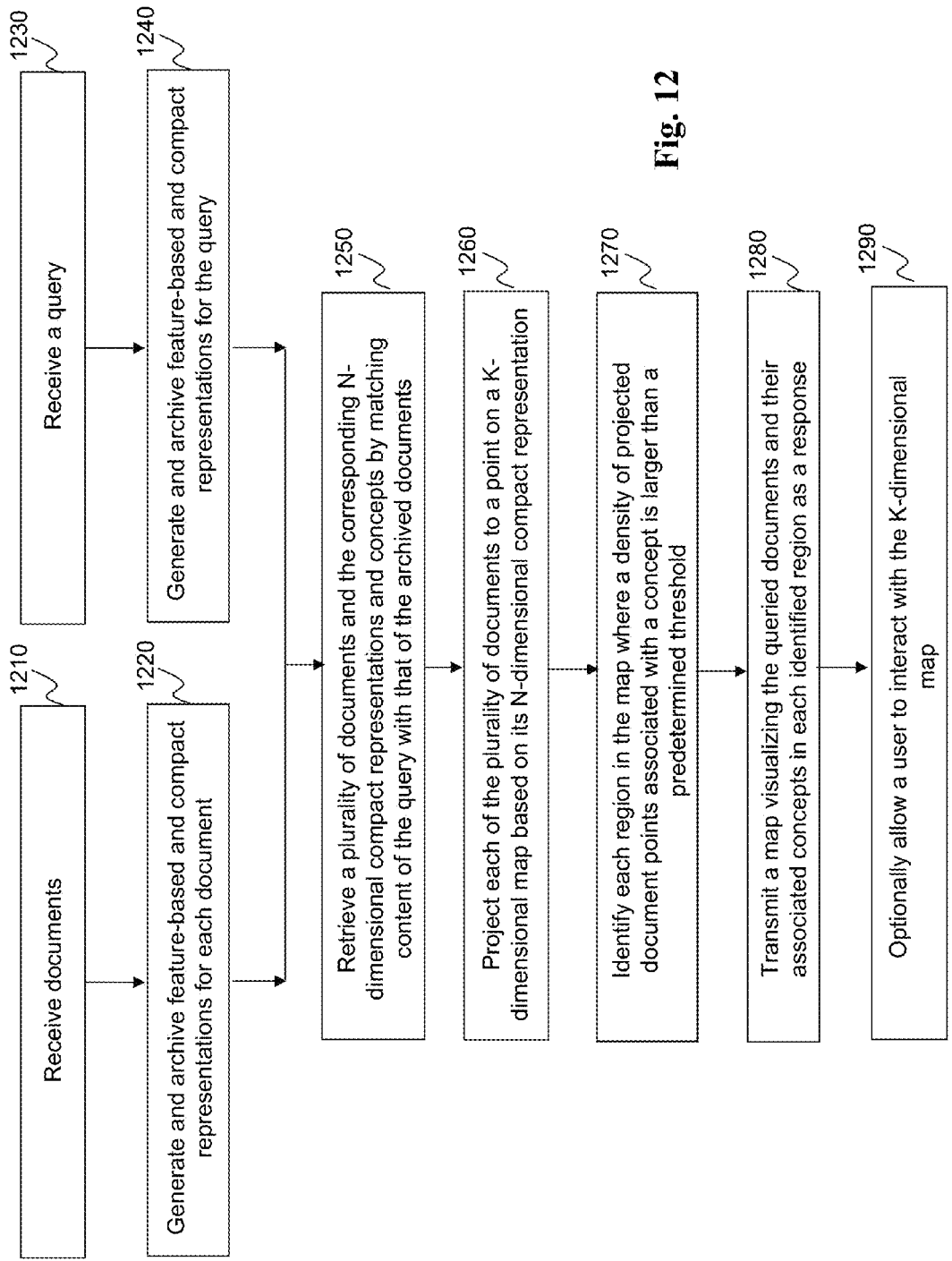
FIG. 12 is a flow chart illustrating an exemplary embodiment of another method for visualizing documents, in accordance with one embodiment of the present disclosure.

FIG. 12 is a flow chart illustrating an exemplary method for visualizing documents obtained via information retrieval, in accordance with one embodiment of the present disclosure. Beginning at 1210, a set of documents is received. Proceeding to 1220, a feature-based representation and an N-dimensional compact representation for each of the set of documents are generated and archived in, e.g., the document representation database 603 of the system 600. As described above, 1210 and 1220 may be performed by, e.g., the document abstraction unit 602 of the system 600. The feature-based representation of each document may be generated based on one or more terms extracted from the document. Independent from 1210 and 1220, a query is received at 1230. Proceeding to 1240 from 1230, a feature-based representation and a compact representation for the query are generated and archived in, e.g., the query representation database 613 of the system 600. As described above, 1230 and 1240 may be performed by, e.g., the query abstraction unit 612 of the system 600. The feature-based representation of the query may be generated based on one or more terms extracted from the query. Moving to 1250 from both 1220 and 1240, a plurality of documents with the corresponding N-dimensional compact representations and concepts is retrieved by matching content of the query with that of the archived documents. The content includes but is not limited to feature-based representations, compact representations, and other meta information. As described above, 1250 may be performed by, e.g., the document matching unit 604 of the system 600. Proceeding to 1260, each of the retrieved documents is projected to a point on a K-dimensional map based on its N-dimensional compact representation. Moving to 1270, each region is identified in the map where the density of projected document points associated with a concept is higher than a predetermined threshold. As described above, 1260 and 1270 may be performed by, e.g., the document mapping unit 606 of the system 600. Moving further to 1280, a map is transmitted to visualize the queried documents and their associated concepts in each identified region, as a response to the query. As described above, 1280 may be performed by, e.g., the document visualization unit 608 of the system 600. In one exemplary embodiment, the disclose system and method optionally allows, at 1290, a user to interact with the K-dimensional map via, e.g., a visual interface, as discussed above with respect to FIG. 7. As discussed therein and below, via observed user interactions, the disclosed system and method are capable of generating a query that is to be used to refine documents retrieval so that further retrieved documents may be closer to what the user in actually interested in. Such an automatically generated query aims at estimating the actual intent or interests of the user who interacted with the K-dimensional map.

Figure 13:
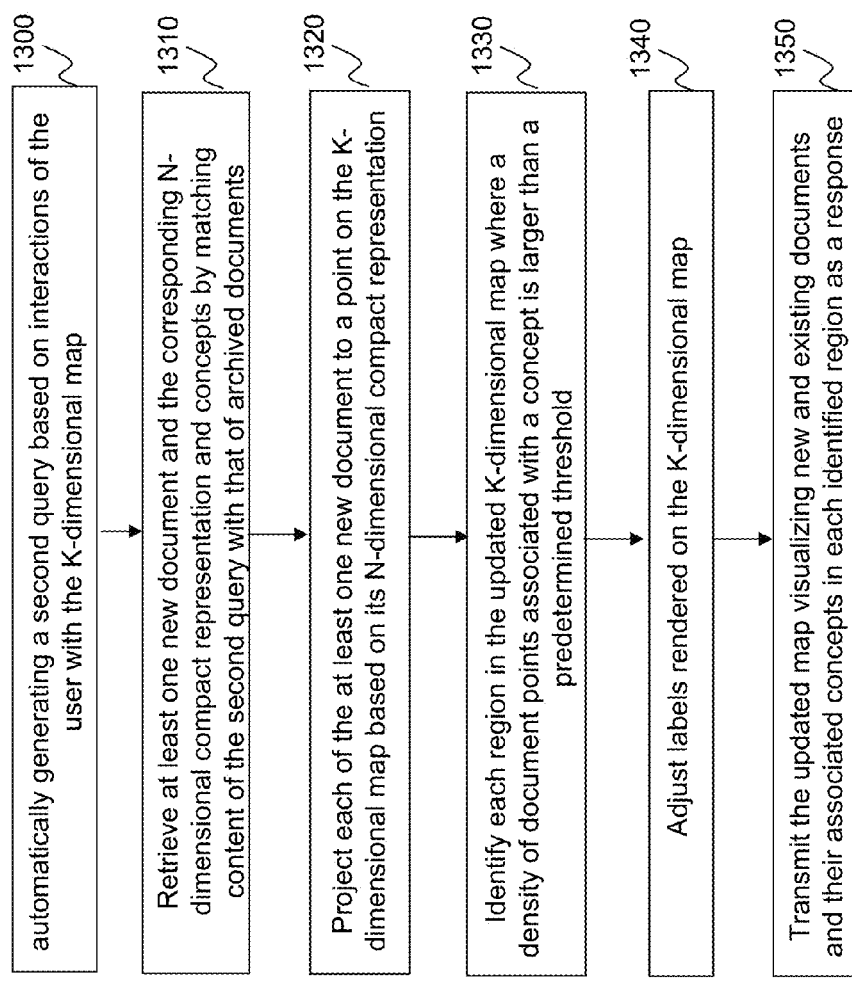
FIG. 13 is a flow chart illustrating an exemplary embodiment of still another method for visualizing documents, in accordance with one embodiment of the present disclosure.

FIG. 13 is a flow chart illustrating an exemplary embodiment of still another method for visualizing documents, in accordance with one embodiment of the present disclosure. FIG. 13 represents the functionality of the disclosed system and method which allows generation of a query based on interactions between a user and a K-dimensional map so as to assist a user to effectively retrieve documents of his/her actual interests. The flow depicted in FIG. 13 works in conjunction with FIG. 12 or FIG. 7. In working with the flow depicted in FIG. 7, there is no initial query present so that a query generated based on observed user interactions corresponds to an initial query. In working with the flow depicted in FIG. 12, as there is an initial query, the automatically generated query based on observed user interactions corresponds to a refined query. In both situations, the system and method disclosed herein allow enhancement in terms of retrieving documents that are more related to a user's interests. Referring now to FIG. 13, a new or refined query is automatically generated, at 1300, based on observed user interactions with the K-dimensional map. Such user interactions may include clicking on a projected document point to, e.g., open the document to take a look, having the cursor near a document point so that some information related to the document is made visible, or clicking or having the cursor near a label associated with a concept to activate the display of certain information associated with the concept. In some embodiments, additional information associated with a concept or document triggered by user's interaction may include functions that, upon being activated, may allow the user to modify an existing query. For instance, by clicking a plus sign displayed for a concept or a document, a user can add a concept or a document which can be used to modify the existing query. An added document can be used as a query by extracting significant terms from the document and using such terms or the compact code for the document, or both as a query. Alternatively, a user may also discount one or more concepts/documents in an existing query result by, e.g., clicking the minus signs displayed for selected concepts/documents. A new query may be generated accordingly based on the dynamic modification to the existing query. In some embodiments, such user interactions may also include selecting a region in the map that includes the concepts and documents of interest. In this case, a new query may be generated based on the concepts and the text of documents in the selected region in the map. User interactions also reflect user's online interests, in certain documents or topics. Based on such observed user's interests, the present teaching is able to further refine the query and retrieval of information that is more aligned with the user's interests. For example, assume that an initial query is "car" and on the K-dimensional map created by the process shown in FIG. 12, there are three concepts rendered with labels "engine", "seats", and "automatic doors". If the user further explores the rendered documents around label "engine", this may indicate that the user is actually interested in car engines, rather than car seats or car doors. In this case, after sensing the user interactions with respect to the K-dimensional map indicating potential interests in car engines, a refined query may be automatically generated as "car engine" based on the observed user behavior without having to wait for the user to add "engine" to the existing query "car". Based on such a refined query, a further document retrieval may be performed to identify documents that are in alignment with the detected user's interests.

Moving to 1310, at least one new document is retrieved, based on the automatically generated second query. Each new document is represented by an N-dimensional compact representation and associated with some concept(s). In this exemplary embodiment, a concept associated with a new document may be a new concept not currently associating with any existing documents on the K-dimensional map, or may also be a concept that is already associated with some document already projected on the K-dimensional map. Proceeding to 1320, each new document is projected as a point on the K-dimensional map based on its N-dimensional compact representation along with existing documents so that all documents represented by existing document points and the newly projected document points in the K-dimensional map maintain the relative distances among the all documents in the N-dimensional space. When both existing and new documents are projected in the update K-dimensional map, the existing document points may now be mapped to different positions as compared with their previously mapped positions.

Moving to 1330, each region in the K-dimensional map is then identified where the density of previously projected document points and the newly projected document points associated with a concept is higher than a predetermined threshold. Once all the documents, which may include both the ones retrieved based on the original query and the documents retrieved based on the second or refined query, are projected on the K-dimensional map, the labels for concepts implied by such documents may need to be adjusted or updated. For example, if a concept is newly found in newly retrieved documents, a new label may need to be rendered to reflect if the density of the documents associated with that concept exceeds a certain threshold. In some situations, although the concept already exists with respect to the previously projected documents, the previous density is too low so that the label representing the concept has not been rendered. Now given that some new documents also imply the same concept, the overall density across both the previously retrieved and newly retrieved documents may now exceed the required threshold so that the label representing the concept now needs to be rendered. If a concept is only associated with newly retrieved documents and the density does not exceed a required threshold, then the label representing the new concept may not be rendered in the K-dimensional map. Specific conditions for updating the labels may depend on application needs. At 1340, the disclosed system adjusts the rendition of labels that need to be rendered on the K-dimensional map. In this way, an updated K-dimensional map is generated. Existing concepts rendered in previous map may or may not be rendered in a different style or location in the map.

Then moving to 1350, as a response to the user interaction with the K-dimensional map, a rendition of the updated K-dimensional map is transmitted with the all documents projected therein and with one or more newly generated labels rendered in corresponding regions identified on the updated K-dimensional map.

In this exemplary embodiment, a new query may be automatically generated or processed each time when the user magnifies or zooms into a specific region of the map. The new query may be generated, in this case, based on the text of the documents and/or the concepts in the magnified region. For example, if a user magnifies a region in a map that is labeled with "race car" and "engine" and have documents about different race car engines, the automatically generated query may now be "race car engine" plus specific engine type in the documents rather than "car engine" as shown in the previous example. Such a new query is generated based on the observed behavior of the user without requiring the user to further specifying expressly an additional query.

In some exemplary embodiments, when a user zooms in a particular region in the K-dimensional map, not only the region can be re-rendered proportionally on-the-fly but also a new query can be automatically generated. When new documents are retrieved based on the newly generated query and new labels corresponding to concepts are created, such new documents and new label, if any, will also be projected into the region that has been zoomed in. In projecting such new documents and rendering new labels, the previously existing document points and labels may impact how the new documents/labels are rendered. In addition, the rendered features of the documents points, existing and new, as well as the labels, existing or new, may also need to be adjusted. For example, the previous color of the document points may change when new documents are also being projected. One example is when the documents with most recent publication dates may be marked as red. Now when new documents are projected into the map, there may be new documents that have even more recent dates so that the documents that used to be marked as red may now need to be marked as other colors.

In some exemplary embodiments, when an updated map is created based on the new or refined query, the labels from the previous K-dimensional map may remain at the same positions as that on the updated K-dimensional map. However, such fixed locations of the labels may impact where on the updated K-dimensional map the newly generated labels should be rendered. Because of that, when the level of magnification increases (e.g., when a user zooms in), additional documents, retrieved based on an automatically refined query, may be projected on the updated K-dimensional map without significantly affecting the visual appearance of the map from a user's perspective with respect to how concepts are positioned. This enables for an infinite magnification with a consistent visual appearance, with each level of magnification leading to a refined query and projection of new documents (retrieved based on the refined query) on the map, all in accordance with the user's interaction with the K-dimensional map.

In a different embodiment, once the new or refined query is generated based on observed user interactions and new documents are retrieved based on the refined query, the K-dimensional map is updated using only the newly retrieved documents. That is, in this embodiment, the previously identified documents and the visualization thereof will not be included in the updated K-dimensional map. However, it is noted that some of the newly retrieved documents may overlap with the previously retrieved documents. Using the previous example to illustrate the point, the initial query is "car" and the retrieved documents using "car" include documents related to car engines. Because the user further explores the documents related to engines, the refined query is "car engine" and a retrieval of relevant documents using query "car engine" likely will include some of the previously retrieved documents related to engines obtained due to query "car".

Figure 14:
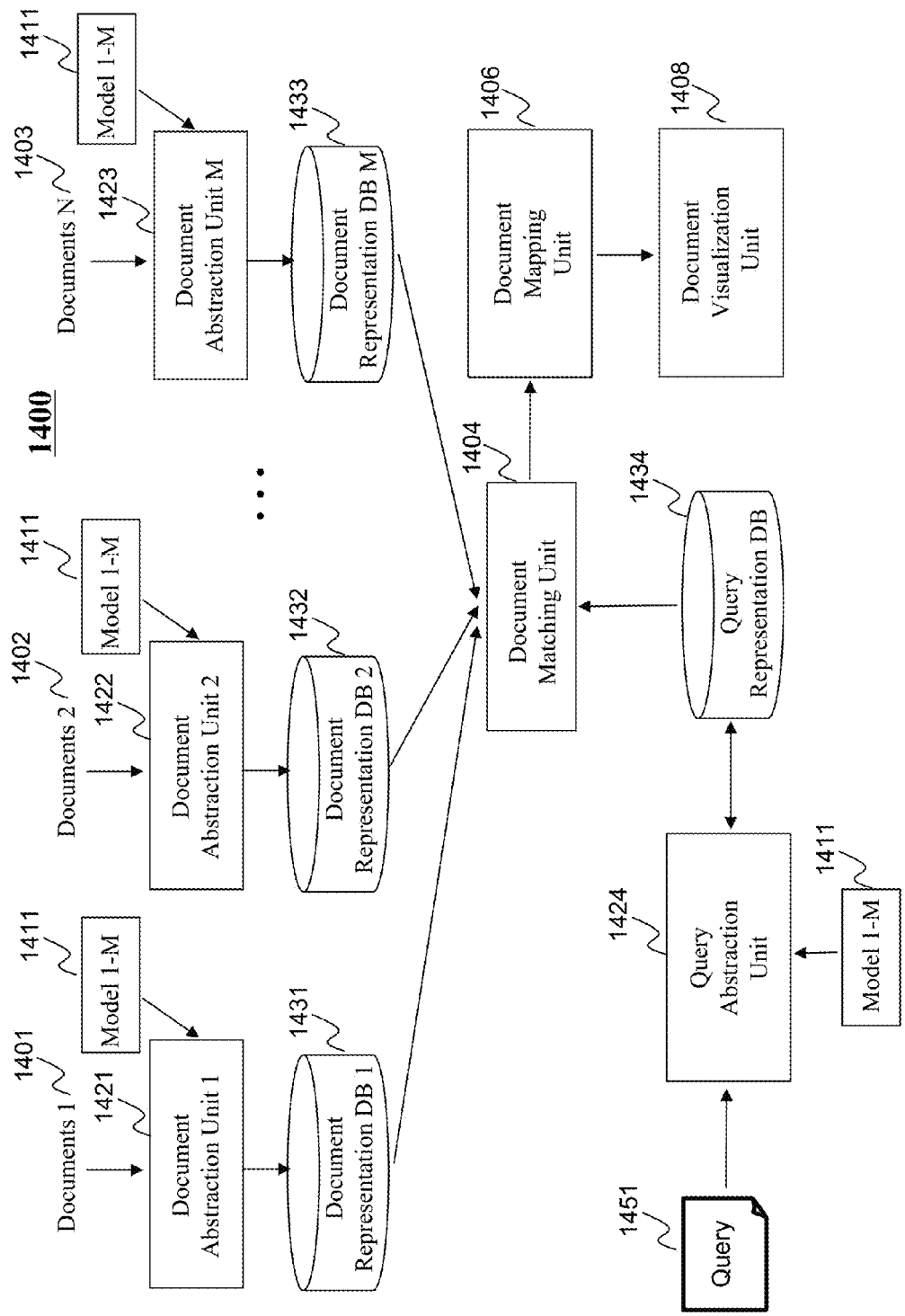
FIG. 14 is a block diagram illustrating an exemplary embodiment of still another system for visualizing documents, in accordance with one embodiment of the present disclosure.

FIG. 14 is a block diagram illustrating an exemplary embodiment of still another system 1400 for visualizing documents, in accordance with one embodiment of the present disclosure. As compared to the system 600, the system 1400 in this exemplary embodiment includes a plurality of document abstraction units 1421, 1422, 1423, a plurality of document representation databases 1431, 1432, 1433, and a plurality of models 1411, for visualizing multiple sets of documents 1401, 1402, 1403. For each i from 1 to M, wherein M is larger or equal to 2, the document abstraction unit i is configured to receive a set of documents i, and generate and archive one or more feature-based representations and compact representations for each of the documents i based on the models 1-M, into the document representation database i. In this exemplary embodiment, one model may represent one subject area that are from one or more pluralities of documents. The system 1400 in this exemplary embodiment further includes a query abstraction unit 1424, which is operatively coupled to models 1-M 1411, for a received query 1451. The query abstraction unit 1424 is configured to receive a query 1451, and generate and archive feature-based representations and compact representations for the query 1451 based on models 1-M 1411, into the query representation database 1434.

The system 1400 in this exemplary embodiment further includes a document matching unit 1404, a document mapping unit 1406, and a document visualization unit 1408. The document matching unit 1404 in this exemplary embodiment is configured to retrieve a plurality of documents each with more or more compact representations and concepts by matching content of the query 1451 with that of the archived documents from document representation databases 1 to M, 1431, 1432, 1433. The document mapping unit 1406 in this exemplary embodiment is operatively coupled to the document matching unit 1404 and configured to project each of the retrieved documents to a point on a K-dimensional map based on its N-dimensional compact representations, and identify each region in the map where the density of projected document points associated with a concept is higher than a predetermined threshold. The document visualization unit 1408 in this exemplary embodiment is operatively coupled to the document mapping unit 606, and configured to transmit a map visualizing the queried documents and their associated concepts in each identified region, as a response to the query 1451.

Figure 15:
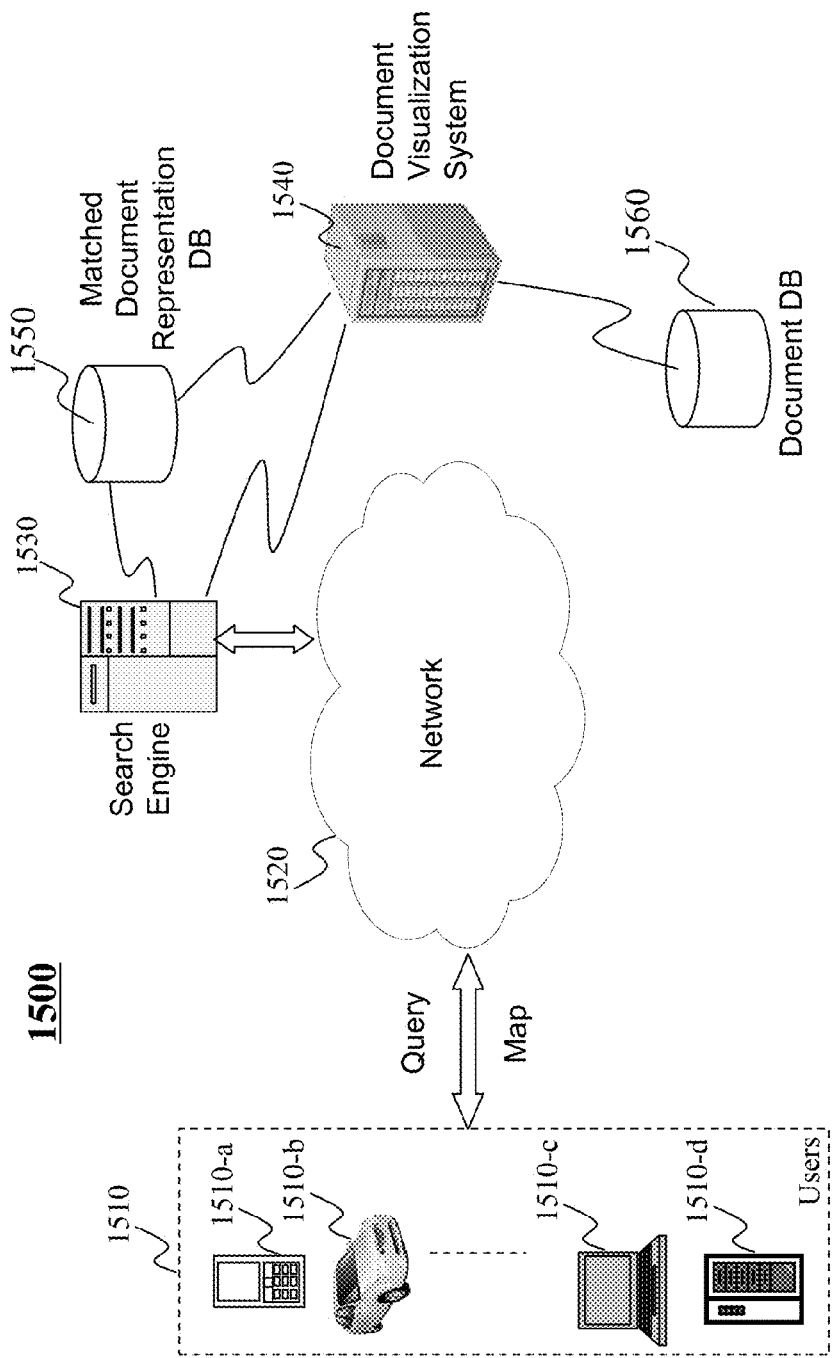
FIG. 15 is a high level depiction of an exemplary system for visualizing documents, in accordance with a first application embodiment of the present disclosure.

FIG. 15 is a high level depiction of an exemplary system 1500 for visualizing documents, in accordance with a first application embodiment of the present disclosure. The exemplary system 1500 includes users 1510, a network 1520, a search engine 1530, a document database 1560, a document visualization system 1540, and a matched document representation database 1550. The network 1520 in system 1500 can be a single network or a combination of different networks. For example, a network 1520 can be a local area network (LAN), a wide area network (WAN), a public network, a private network, a proprietary network, a Public Telephone Switched Network (PSTN), the Internet, a wireless network, a virtual network, or any combination thereof. Users 1510 may be of different types such as users connected to the network via desktop connections (1510-d), users connecting to the network via wireless connections such as through a laptop (1510-c), a handheld device (1510-a), or a built-in device in a motor vehicle (1510-b). A user 1510 may send a query to the search engine 1530 via the network 1520 and receive a visualized map as a response from the search engine 1530 through the network 1520. The search engine 1530 in this exemplary system searches for one or more matched documents stored in the database 1550 with their document representations and concepts, based on the received query and the documents in database 1560 provided by the document visualization system 1540. In this exemplary system 1500, the document visualization system 1540 generates the visualized map based on the matched documents in the database 1550, and renders the map to the search engine 1530, which forwards the map to the user 1510. In this exemplary system 1500, the search engine 1530 is configured to respond to the query of the user 1510.

Figure 16:
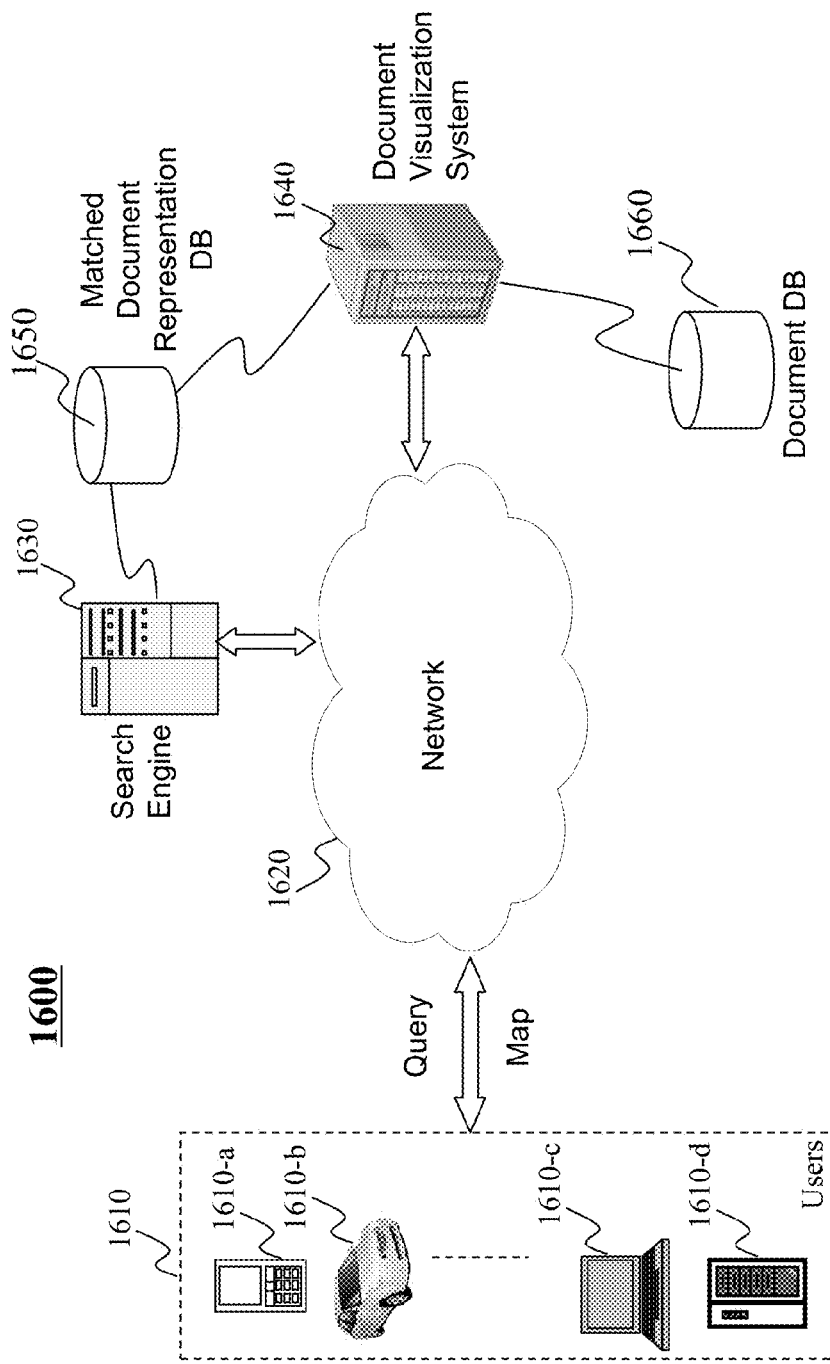
FIG. 16 is a high level depiction of an exemplary system for visualizing documents, in accordance with a second application embodiment of the present disclosure.

FIG. 16 is a high level depiction of an exemplary system 1600 for visualizing documents, in accordance with a second application embodiment of the present disclosure. The exemplary system 1600 includes users 1610, a network 1620, a search engine 1630, a document database 1660, a document visualization system 1640, and a matched document representation database 1650. The network 1620 in system 1600 can be a single network or a combination of different networks. For example, a network 1620 can be a local area network (LAN), a wide area network (WAN), a public network, a private network, a proprietary network, a Public Telephone Switched Network (PSTN), the Internet, a wireless network, a virtual network, or any combination thereof. Users 1610 may be of different types such as users connected to the network via desktop connections (1610-*d*), users connecting to the network via wireless connections such as through a laptop (1610-*c*), a handheld device (1610-*a*), or a built-in device in a motor vehicle (1610-*b*). A user 1610 may send a query to the search engine 1630 via the network 1620 and receive a visualized map as a response. The search engine 1630 in this exemplary system searches for one or more matched documents stored in the database 1650 with their document representations and concepts, based on the received query and the documents in database 1660 provided by the document visualization system 1640. In this exemplary system 1600, the document visualization system 1640 generates the visualized map based on the matched documents in the database 1650, and renders the map to the user 1610. In this exemplary system 1600, the document visualization system 1640 is configured to respond to the query of the user 1510.

Figure 17:
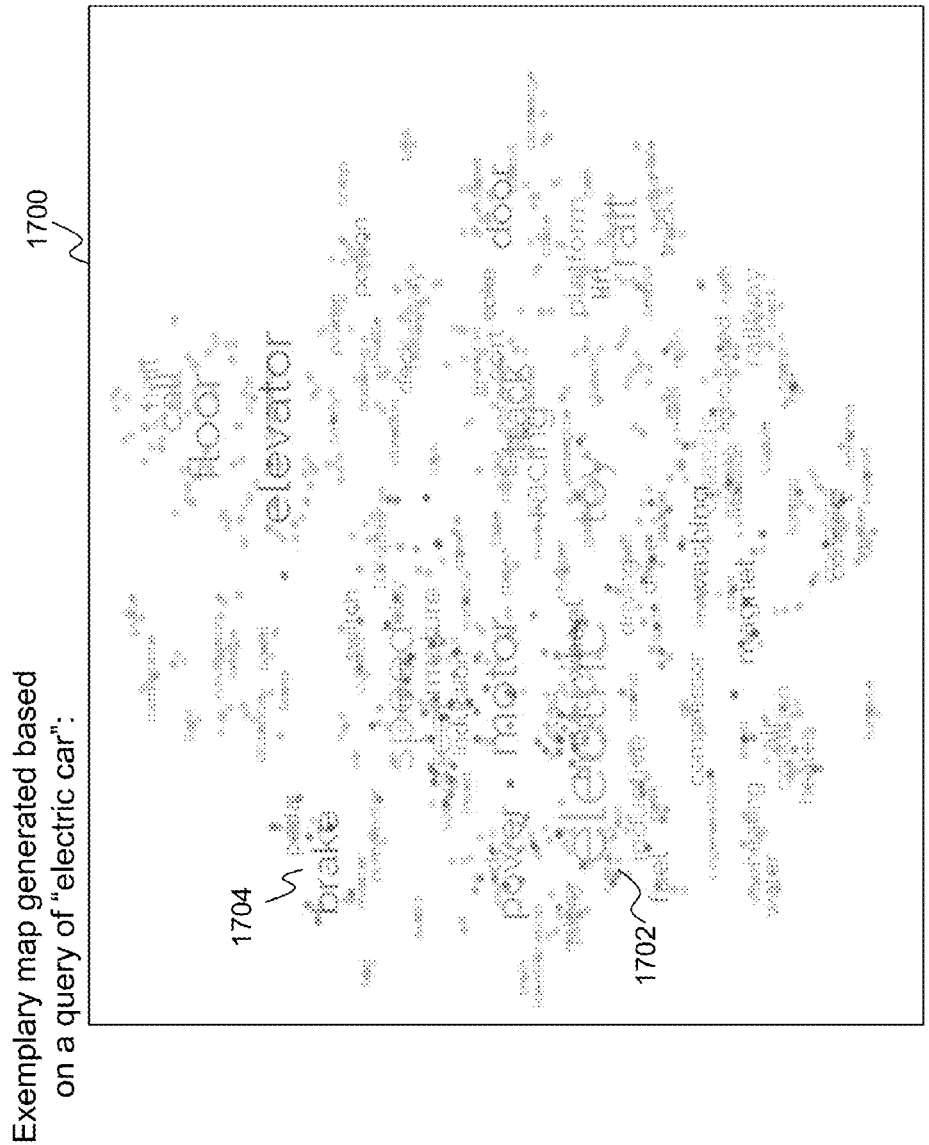
FIG. 17 illustrates an exemplary map generated based on a query of "electric car", in accordance with one embodiment of the present disclosure.

FIG. 17 illustrates an exemplary map 1700 generated based on a query of "electric car", in accordance with one embodiment of the present disclosure. As illustrated in the exemplary map 1700, each of the displayed document points represents a document related to the query of "electric car". The document points displayed closer on the map represent documents that are more semantically related to each other, compared to the document points displayed farther away. Labels are rendered in each region in the map where the density of document points associated with a concept is higher than a predetermined threshold. For example, label "electric" 1702 is rendered with a larger font based on a larger size of the region covering the concepts relating to "electric", and label "brake" 1704 is rendered with a smaller font based on a smaller size of the region covering the concepts relating to "brake".

Figure 18:
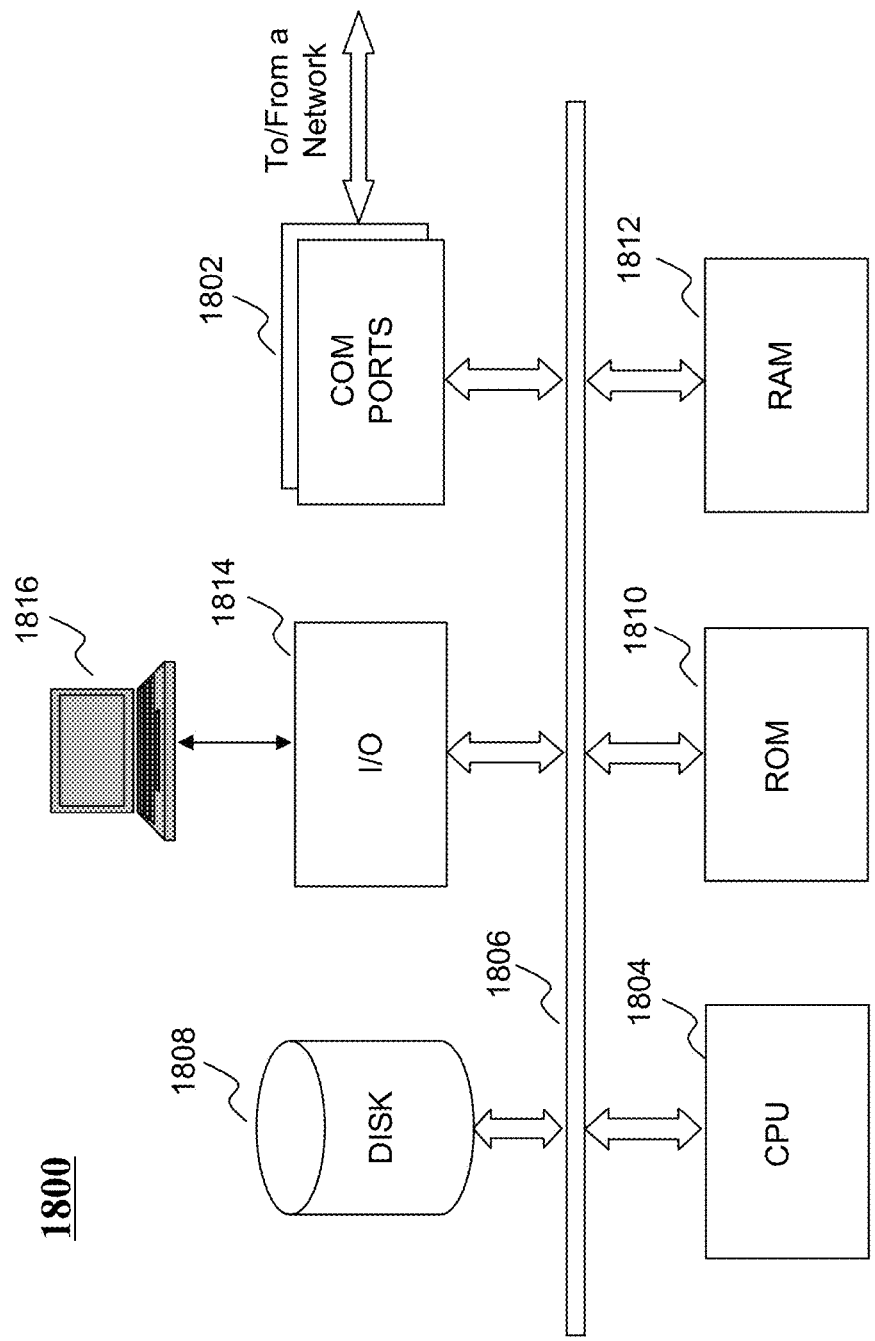
FIG. 18 depicts a general computer architecture on which the present disclosure can be implemented.

FIG. 18 depicts a general computer architecture on which the present disclosure can be implemented and has a functional block diagram illustration of a computer hardware platform which includes user interface elements. The computer may be a general-purpose computer or a special purpose computer. This computer 1800 can be used to implement any components of the system for visualizing documents as described herein. Different components of the systems 100, 600, 1400, e.g., as depicted in FIGS. 1, 6 and 14, can all be implemented on one or more computers such as computer 1800, via its hardware, software program, firmware, or a combination thereof. Although only one such computer is shown, for convenience, the computer functions relating to dynamic relation and event detection may be implemented in a distributed fashion on a number of similar platforms, to distribute the processing load.

The computer 1800, for example, includes COM ports 1802 connected to and from a network connected thereto to facilitate data communications. The computer 1800 also includes a central processing unit (CPU) 1804, in the form of one or more processors, for executing program instructions. The exemplary computer platform includes an internal communication bus 1806, program storage and data storage of different forms, e.g., disk 1808, read only memory (ROM) 1810, or random access memory (RAM) 1812, for various data files to be processed and/or communicated by the computer, as well as possibly program instructions to be executed by the CPU. The computer 1800 also includes an I/O component 1814, supporting input/output flows between the computer and other components therein such as user interface elements 1816. The computer 1800 may also receive programming and data via network communications.

Hence, aspects of the method for visualizing documents, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the computer-implemented method.

All or portions of the computer-implemented method may at times be communicated through a network such as the Internet or various other telecommunication networks. Such communications, for example, may enable loading of the software from one computer or processor into another. Thus, another type of media that may bear the elements of the computer-implemented method includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the computer-implemented method. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present disclosure is amenable to a variety of modifications and/or enhancements. For example, although the implementation of various components described above may be embodied in a hardware device, it can also be implemented as a firmware, firmware/software combination, firmware/hardware combination, or a hardware/firmware/software combination.

While the foregoing description and drawings represent embodiments of the present disclosure, it will be understood that various additions, modifications, and substitutions may be made therein without departing from the spirit and scope of the principles of the present disclosure as defined in the accompanying claims. One skilled in the art will appreciate that the present disclosure may be used with many modifications of form, structure, arrangement, proportions, materials, elements, and components and otherwise, used in the practice of the disclosure, which are particularly adapted to specific environments and operative requirements without departing from the principles of the present disclosure. The presently disclosed embodiments are therefore to be considered in all respects as illustrative and not restrictive, the scope of the present disclosure being indicated by the appended claims and their legal equivalents, and not limited to the foregoing description.

What is claimed is:

1. A method, implemented on at least one machine having at least one processor, storage, and a communication platform connected to a network for visualizing documents, comprising the steps of:
    receiving, from a user via the communication platform, a first query;
    retrieving, based on the first query, a plurality of documents, each of which is represented by an N-dimensional compact representation, wherein each of the retrieved documents is associated with at least one concept;
    transmitting, as a response to the first query via the communication platform, a rendition of a K-dimensional map with:
    the plurality of documents projected as projected document points on the K-dimensional map, wherein the projected document points in the K-dimensional map maintain the relative distances among the plurality of documents in the N-dimensional space, wherein N is larger than K and K is larger than one, and
    one or more rendered labels each corresponding to a concept in a region identified in the K-dimensional map;
    automatically generating a second query based on interactions of the user with the K-dimensional map;
    retrieving, based on the second query, at least one new document, each of which is represented by an N-dimensional compact representation, wherein each of the at least one new document is associated with at least one concept;
    projecting each of the at least one new document and at least some of the retrieved documents to a newly projected document point on the K-dimensional map based on its N-dimensional compact representation so that the newly projected document points in the K-dimensional map maintain the relative distances in the N-dimensional space;
    identifying, each region in the K-dimensional map associated with a concept;
    generating a new label for each concept in each region identified;
    rendering one or more of the new labels in the K-dimensional map to generate an updated K-dimensional map; and
    transmitting, as a response to the interaction of the user with the K-dimensional map, a rendition of the updated K-dimensional map.

2. The method of claim 1, wherein K is one of two and three.

3. The method of claim 1 wherein in each region identified, a new label generated for a concept associating with the region, is rendered with a more or less outstanding feature.

4. The method of claim 3, wherein the more or less outstanding feature includes at least one of a darker color determined based on the density of documents associated with the concept in the region and larger font size determined based on the size of the region.

5. The method of claim 1, wherein the K-dimensional map and/or content contained therein can be manipulated by the user when at least one of the following:
    a cursor is near to the projected document point and/or the rendered label;
    a cursor is clicked near the projected document point and/or the rendered label;
    a cursor is in a region in the K-dimensional map that is marked;
    a touch-sensitive device or a virtually touch-sensitive device is touched near the projected document point and/or the rendered label;
    a motion-sensitive device senses a motion pointing to the projected document point and/or the rendered label; and
    an action is taken by the user with respect to a visual interface configured for, at least partially, manipulating the K-dimensional map.

6. The method of claim 1, wherein at least one of the projected document points on the K-dimensional map is actionable to render information associated with the projected document.

7. The method of claim 1, wherein a label rendered on the K-dimensional map is actionable to render information related to the concept associated with the label.

8. The method of claim 1, wherein the step of retrieving, based on the first query, a plurality of documents, comprises:
    extracting one or more terms from the first query;
    generating a feature-based representation for the first query based on the extracted terms;
    obtaining a query representation based on the feature-based representation of the first query;
    obtaining document representations for a set of documents; and
    matching the query representation of the first query with the document representations of the set of documents to identify the plurality of documents whose document representations match the query representation.

9. The method of claim 8, wherein a document representation for a document is generated by:
    extracting a plurality of terms from the document;
    generating a feature-based representation for the document based on the extracted terms; and
    computing the N-dimensional compact representation for the document based on the feature-based representation of the document.

10. The method of claim 1, wherein:
    each projected document point has a color indicating at least one type of document meta information that includes document creation time, author of the document, owner of the document, and relevance of the document to the first query; and
    the newly projected document point has a color indicating at least one type of document meta information that includes document creation time, author of the newly projected document, owner of the newly projected document, and relevance of the newly projected document to the second query.

11. A method, implemented on at least one machine having at least one processor, storage, and a communication platform connected to a network for visualizing documents, comprising the steps of:
    receiving, from a user via the communication platform, a first query;
    retrieving, based on the first query, a first set of documents, each of which is represented by an N-dimensional compact representation, wherein each document in the first set of documents is associated with at least one concept;
    transmitting, as a response to the first query via the communication platform, a rendition of a first K-dimensional map with:
        the first set of documents projected as projected document points on the first K-dimensional map, wherein the projected document points on the first K-dimensional map maintain the relative distances among the first set of documents in the N-dimensional space, and
        one or more rendered labels each corresponding to a concept in a region identified in the first K-dimensional map;
    automatically generating a second query based on interactions of the user with the first K-dimensional map;
    retrieving, based on the second query, a second set of documents, each of which is represented by an N-dimensional compact representation and is associated with at least one concept;
    projecting each document in the second set of documents to a projected document point on a second K-dimensional map based on its N-dimensional compact representation so that the projected document points in the second K-dimensional map maintain the relative distances in the N-dimensional space, wherein N is larger than K and K is larger than one;
    identifying, each region in the second K-dimensional map associated with a concept;
    rendering a label for each concept in each region identified in the second K-dimensional map; and
    transmitting, in response to the interaction of the user with the first K-dimensional map, a rendition of the second K-dimensional map.

12. The method of claim 11, wherein K is one of two and three.

13. The method of claim 11, wherein in each region identified, a new label generated for a concept associating with the region, is rendered with a more or less outstanding feature.

14. The method of claim 13, wherein the more or less outstanding feature includes at least one of a darker color determined based on the density of documents associated with the concept in the region and larger font size determined based on the size of the region.

15. The method of claim 11, wherein the first or second K-dimensional map, and/or content contained therein can be manipulated by the user when at least one of the following:
    a cursor is near to the projected document point and/or the rendered label;
    a cursor is clicked near the projected document point and/or the rendered label;
    a cursor is in a region in the first or second K-dimensional map that is marked;
    a touch-sensitive device or a virtually touch-sensitive device is touched near the projected document point and/or the rendered label;
    a motion-sensitive device senses a motion pointing to the projected document point and/or the rendered label; and
    an action is taken by the user with respect to a visual interface configured for, at least partially, manipulating the first or second K-dimensional map.

16. The method of claim 11, wherein at least one of the projected document points on the first or second K-dimensional map is actionable to activate a display of information associated with the projected document.

17. The method of claim 11, wherein a label rendered on the first or second K-dimensional map is actionable to activate a display of information related to the concept associated with the label.

18. The method of claim 11, wherein the step of retrieving, based on the second query, a second set of documents, comprises:
    extracting one or more terms from the second query;
    generating a feature-based representation for the second query based on the extracted terms;
    obtaining a query representation based on the feature-based representation of the second query;
    obtaining document representations for a plurality of documents; and
    matching the query representation of the second query with the document representations of the plurality of documents to identify the second set of documents whose document representations match the query representation.

19. The method of claim 18, wherein a document representation for a document is generated by:
    extracting a plurality of terms from the document;
    generating a feature-based representation for the document based on the extracted terms; and
    computing the N-dimensional compact representation for the document based on the feature-based representation of the document.

20. The method of claim 11, wherein each projected document point has a color indicating at least one type of document meta information that includes document creation time, author of the document, owner of the document, and relevance of the document to the first or second query.

* * * * *